United States Patent
Chew

(10) Patent No.: US 10,089,264 B2
(45) Date of Patent: Oct. 2, 2018

(54) CALLBACK INTERRUPT HANDLING FOR MULTI-THREADED APPLICATIONS IN COMPUTING ENVIRONMENTS

(71) Applicant: INTEL CORPORATION, Santa Clara, CA (US)

(72) Inventor: Yen Hsiang Chew, Georgetown (MY)

(73) Assignee: INTEL CORPORATION, Santa Clara, CA (US)

( * ) Notice: Subject to any disclaimer, the term of this patent is extended or adjusted under 35 U.S.C. 154(b) by 151 days.

(21) Appl. No.: 15/154,408

(22) Filed: May 13, 2016

(65) Prior Publication Data

US 2017/0329729 A1 Nov. 16, 2017

(51) Int. Cl.
G06F 13/00 (2006.01)
G06F 13/24 (2006.01)
G06F 9/54 (2006.01)

(52) U.S. Cl.
CPC ............... *G06F 13/24* (2013.01); *G06F 9/54* (2013.01)

(58) Field of Classification Search
CPC .................................. G06F 13/24; G06F 9/54
See application file for complete search history.

(56) References Cited

U.S. PATENT DOCUMENTS 8,667,201 B2 * 3/2014 Sander ............... G06F 17/5009
710/260
9,158,574 B2 * 10/2015 Mansell .............. G06F 11/3636

| | | | |
|---|---|---|---|
| 2004/0015627 A1 | 1/2004 | Desoli et al. | |
| 2006/0047877 A1 | 3/2006 | Winkler et al. | |
| 2012/0179851 A1 | 7/2012 | Sander et al. | |
| 2013/0275639 A1 | 10/2013 | Chew | |
| 2014/0359187 A1 | 12/2014 | Murata | |

OTHER PUBLICATIONS

PCT International Search Report and Written Opinion of the International Searching Authority for International Application No. PCT/US2017/027456, dated Sep. 20, 2017, 12 pages.

* cited by examiner

*Primary Examiner* — Tammara R Peyton
(74) *Attorney, Agent, or Firm* — Womble Bond Dickinson (US) LLP

(57) ABSTRACT

A mechanism is described for facilitating callback interrupt handling for multi-threaded applications in computing environments. A method of embodiments, as described herein, includes detecting a task issued by a thread associated with an application processor, where the task is to be processed by a graphics processor at the apparatus. The method may further include scheduling the task at the graphics processor, and emulating an interrupt to the application processor, where the emulated interrupt disables one or more graphics interrupts while the task is being processed by the graphics processor. The method may further include facilitating an interrupt handler to communicate a signal to the application processor to wake up the thread, where the thread is facilitated to perform one or more tasks independent of the task being processed by the graphics processor.

24 Claims, 22 Drawing Sheets

GRAPHICS PROCESSOR INSTRUCTION FORMATS
700
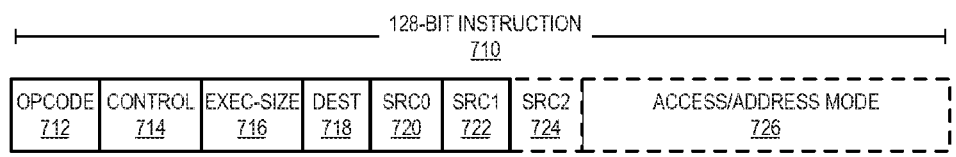
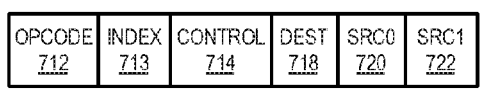
OPCODE DECODE
740
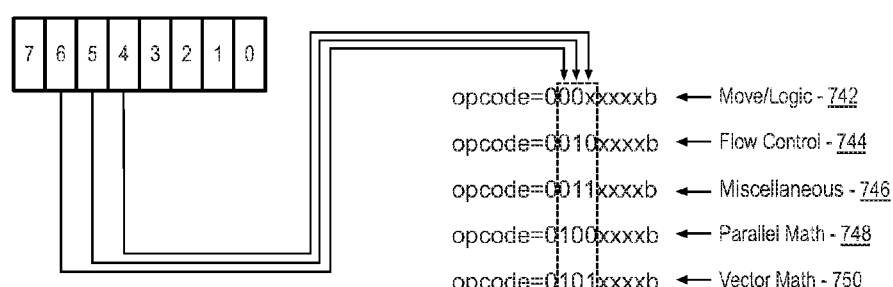
FIG. 7

US 10,089,264 B2

CALLBACK INTERRUPT HANDLING FOR MULTI-THREADED APPLICATIONS IN COMPUTING ENVIRONMENTS

FIELD

Embodiments described herein generally relate to computers. More particularly, embodiments are described for facilitating callback interrupt handling for multi-threaded applications in computing environments.

BACKGROUND

Conventionally, central processing units (CPUs) see a graphics driver as a monolithic resource such that for multi-threaded applications, a CPU thread would request a graphics resource by acquiring a lock or entering a critical code section before it issues a task to the graphics processing unit (GPU). This conventional technique lacks CPU-GPU synchronization and thus results in latency while causing other inefficiencies and waste of system resources.

BRIEF DESCRIPTION OF THE DRAWINGS

Embodiments are illustrated by way of example, and not by way of limitation, in the figures of the accompanying drawings in which like reference numerals refer to similar elements.

FIG. 7 is a block diagram illustrating a graphics processor instruction formats according to some embodiments.

DETAILED DESCRIPTION

Figure 1:
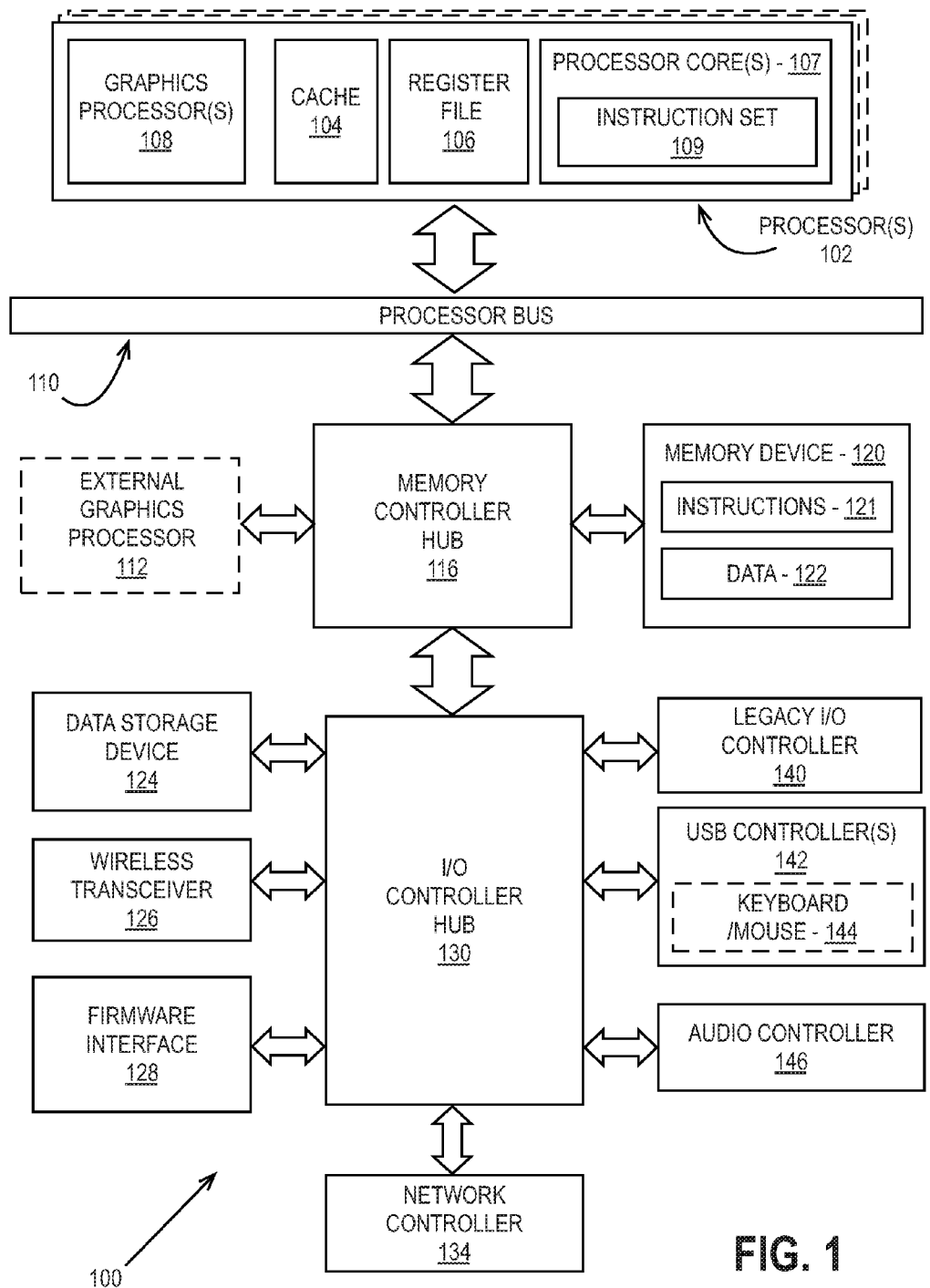
FIG. 1 is a block diagram of a processing system, according to an embodiment.

In the following description, numerous specific details are set forth. However, embodiments, as described herein, may be practiced without these specific details. In other instances, well-known circuits, structures and techniques have not been shown in details in order not to obscure the understanding of this description.

Embodiments provide for a novel technique for facilitating CPU-GPU callback interrupt handling for multi-threaded applications in computing environments.

Embodiments provide for a novel technique for evaluating GPU callback interrupts that enable multiple CPU threads to asynchronously issue tasks to a GPU such that each thread may be individually signaled when its issued task is completed without blocking other threads from issuing additional tasks to the GPU. In one embodiment, issuing of a task may include invoking an application programming interface (API) of a graphics driver such that the API includes a thread identification (ID) referencing a thread.

It is contemplated that terms like "request", "query", "job", "work", "work item", and "workload" may be referenced interchangeably throughout this document. Similarly, an "application" or "agent" may refer to or include a computer program, a software application, a game, a workstation application, etc., offered through an application programming interface (API), such as a free rendering API, such as Open Graphics Library (OpenGL®), DirectX® 11, DirectX® 12, etc., where "dispatch" may be interchangeably referred to as "work unit" or "draw" and similarly, "application" may be interchangeably referred to as "workflow" or simply "agent". For example, a workload, such as that of a three-dimensional (3D) game, may include and issue any number and type of "frames" where each frame may represent an image (e.g., sailboat, human face). Further, each frame may include and offer any number and type of work units, where each work unit may represent a part (e.g., mast of sailboat, forehead of human face) of the image (e.g., sailboat, human face) represented by its corresponding frame. However, for the sake of consistency, each item may be referenced by a single term (e.g., "dispatch", "agent", etc.) throughout this document.

In some embodiments, terms like "display screen" and "display surface" may be used interchangeably referring to the visible portion of a display device while the rest of the display device may be embedded into a computing device, such as a smartphone, a wearable device, etc. It is contemplated and to be noted that embodiments are not limited to any particular computing device, software application, hardware component, display device, display screen or surface, protocol, standard, etc. For example, embodiments may be applied to and used with any number and type of real-time applications on any number and type of computers, such as desktops, laptops, tablet computers, smartphones, head-mounted displays and other wearable devices, and/or the like. Further, for example, rendering scenarios for efficient performance using this novel technique may range from simple scenarios, such as desktop compositing, to complex scenarios, such as 3D games, augmented reality applications, etc.

System Overview

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled with a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple with ICH 130. In some embodiments, a high-performance network controller (not shown) couples with processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
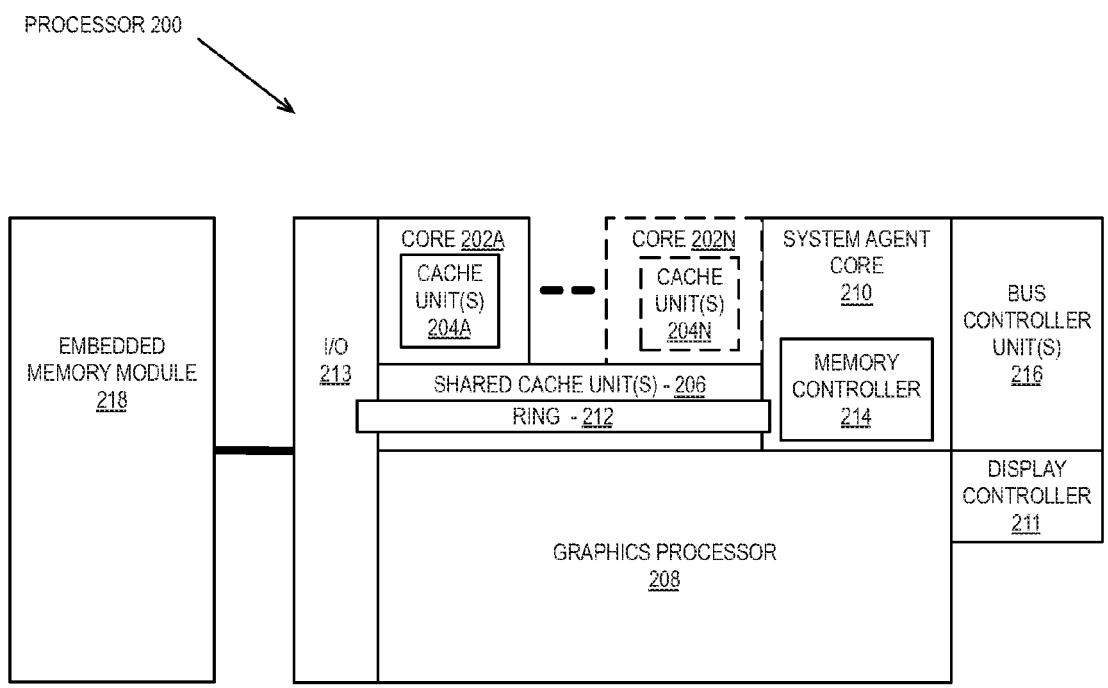
FIG. 2 is a block diagram of an embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
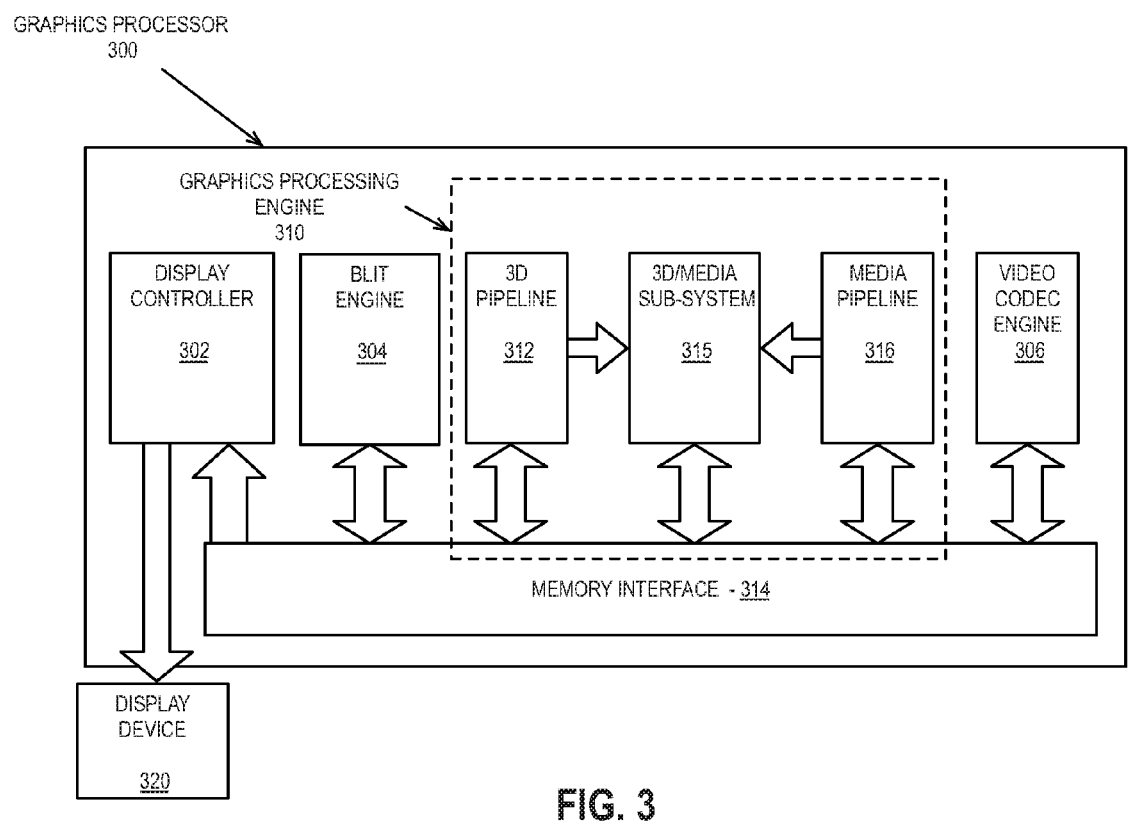
FIG. 3 is a block diagram of a graphics processor, which may be a discrete graphics processing unit, or may be a graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

Graphics Processing Engine

Figure 4:
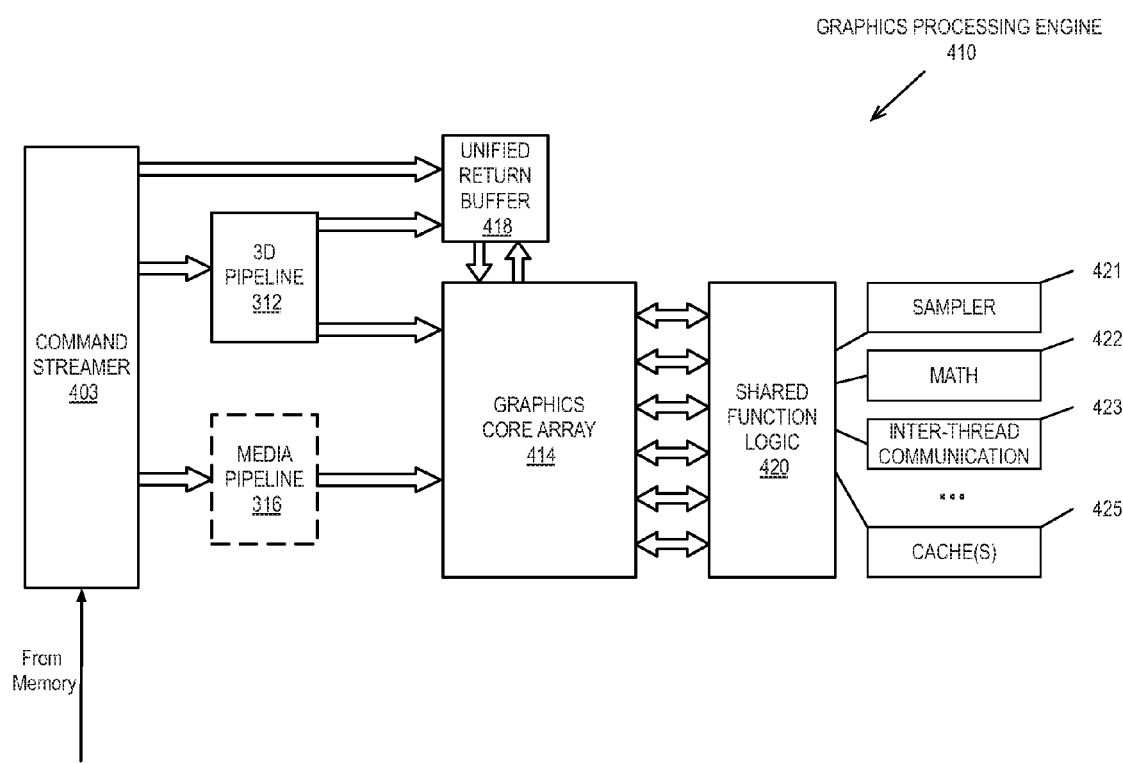
FIG. 4 is a block diagram of a graphics processing engine of a graphics processor in accordance with some embodiments.

FIG. 4 is a block diagram of a graphics processing engine 410 of a graphics processor in accordance with some embodiments. In one embodiment, the graphics processing engine (GPE) 410 is a version of the GPE 310 shown in FIG. 3. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3 are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414.

In various embodiments the 3D pipeline 312 can execute one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources. Multi-purpose execution logic (e.g., execution units) within the graphic core array 414 includes support for various 3D API shader languages and can execute multiple simultaneous execution threads associated with multiple shaders.

In some embodiments the graphics core array 414 also includes execution logic to perform media functions, such as video and/or image processing. In one embodiment, the execution units additionally include general-purpose logic that is programmable to perform parallel general purpose computational operations, in addition to graphics processing operations. The general purpose logic can perform processing operations in parallel or in conjunction with general purpose logic within the processor core(s) 107 of FIG. 1 or core 202A-202N as in FIG. 2.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420. A shared function is implemented where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies between embodiments.

Figure 5:
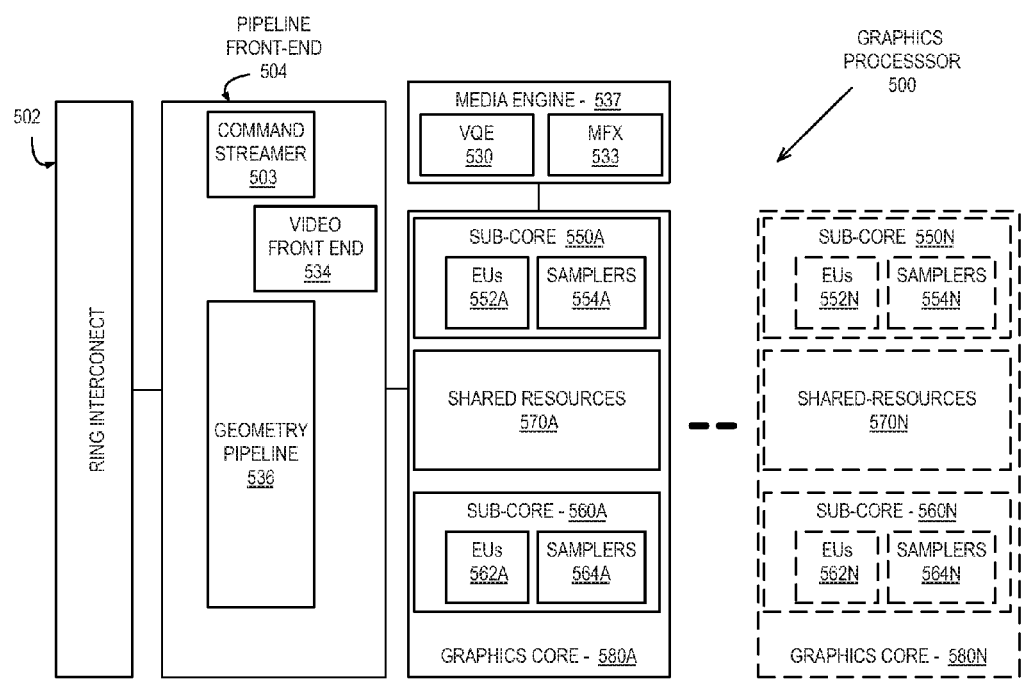
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Execution Units

Figure 6:
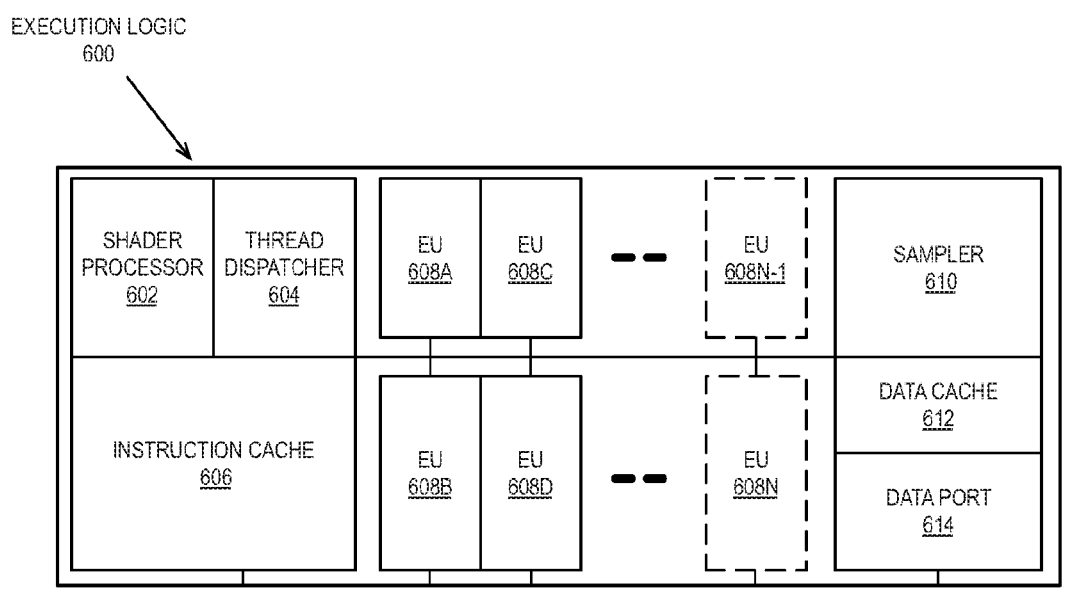
FIG. 6 illustrates thread execution logic including an array of processing elements employed in some embodiments of a graphics processing engine.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a shader processor 602, a thread dispatcher 604, instruction cache 606, a scalable execution unit array including a plurality of execution units 608A-608N, a sampler 610, a data cache 612, and a data port 614. In one embodiment the scalable execution unit array can dynamically scale by enabling or disabling one or more execution units (e.g., any of execution unit 608A, 608B, 608C, 608D, through 608N-1 and 608N) based on the computational requirements of a workload. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution units 608A-608N. In some embodiments, each execution unit (e.g. 608A) is a stand-alone programmable general purpose computational unit that is capable of executing multiple simultaneous hardware threads while processing multiple data elements in parallel for each thread. In various embodiments, the array of execution units 608A-608N is scalable to include any number individual execution units.

In some embodiments, the execution units 608A-608N are primarily used to execute shader programs. A shader processor 602 can process the various shader programs and dispatch execution threads associated with the shader programs via a thread dispatcher 604. In one embodiment the thread dispatcher includes logic to arbitrate thread initiation requests from the graphics and media pipelines and instantiate the requested threads on one or more execution unit in the execution units 608A-608N. For example, the geometry pipeline (e.g., 536 of FIG. 5) can dispatch vertex, tessellation, or geometry shaders to the thread execution logic 600 (FIG. 6) for processing. In some embodiments, thread dispatcher 604 can also process runtime thread spawning requests from the executing shader programs.

In some embodiments, the execution units 608A-608N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 608A-608N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 608A-608N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, a sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. Once a group of geometric objects has been processed and rasterized into pixel data, pixel processor logic (e.g., pixel shader logic, fragment shader logic, etc.) within the shader processor 602 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 602 then executes an application programming interface (API)-supplied pixel or fragment shader program. To execute the shader program, the shader processor 602 dispatches threads to an execution unit (e.g., 608A) via thread dispatcher 604. In some embodiments, pixel shader 602 uses texture sampling logic in the sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
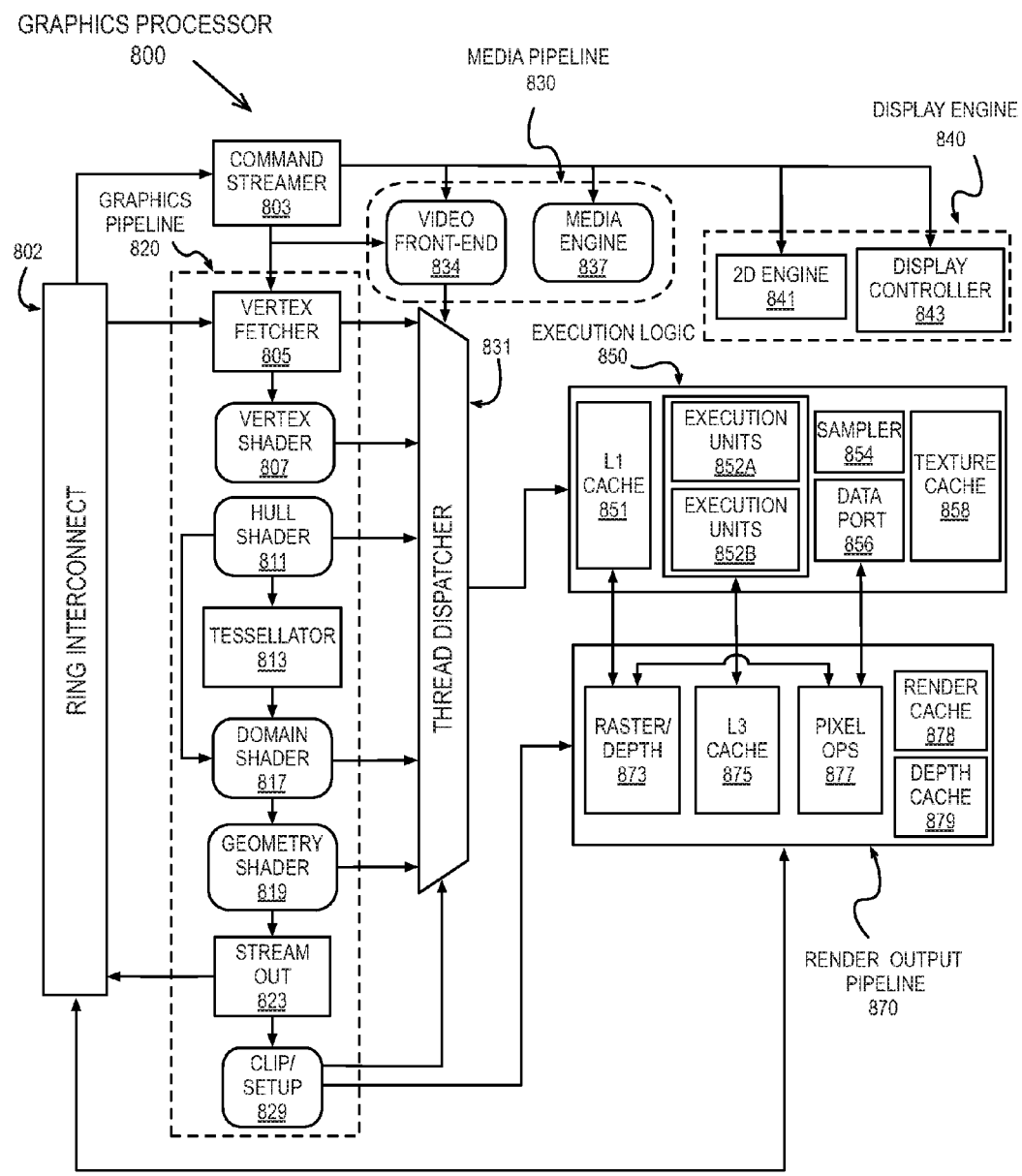
FIG. 8 is a block diagram of another embodiment of a graphics processor.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A-852B via a thread dispatcher 831.

In some embodiments, execution units 852A-852B are an array of vector processors having an instruction set for performing graphics and media operations. In some embodiments, execution units 852A-852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components (e.g., hull shader 811, tessellator 813, and domain shader 817) can be bypassed.

In some embodiments, complete geometric objects can be processed by a geometry shader 819 via one or more threads dispatched to execution units 852A-852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A-852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A-852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 9:
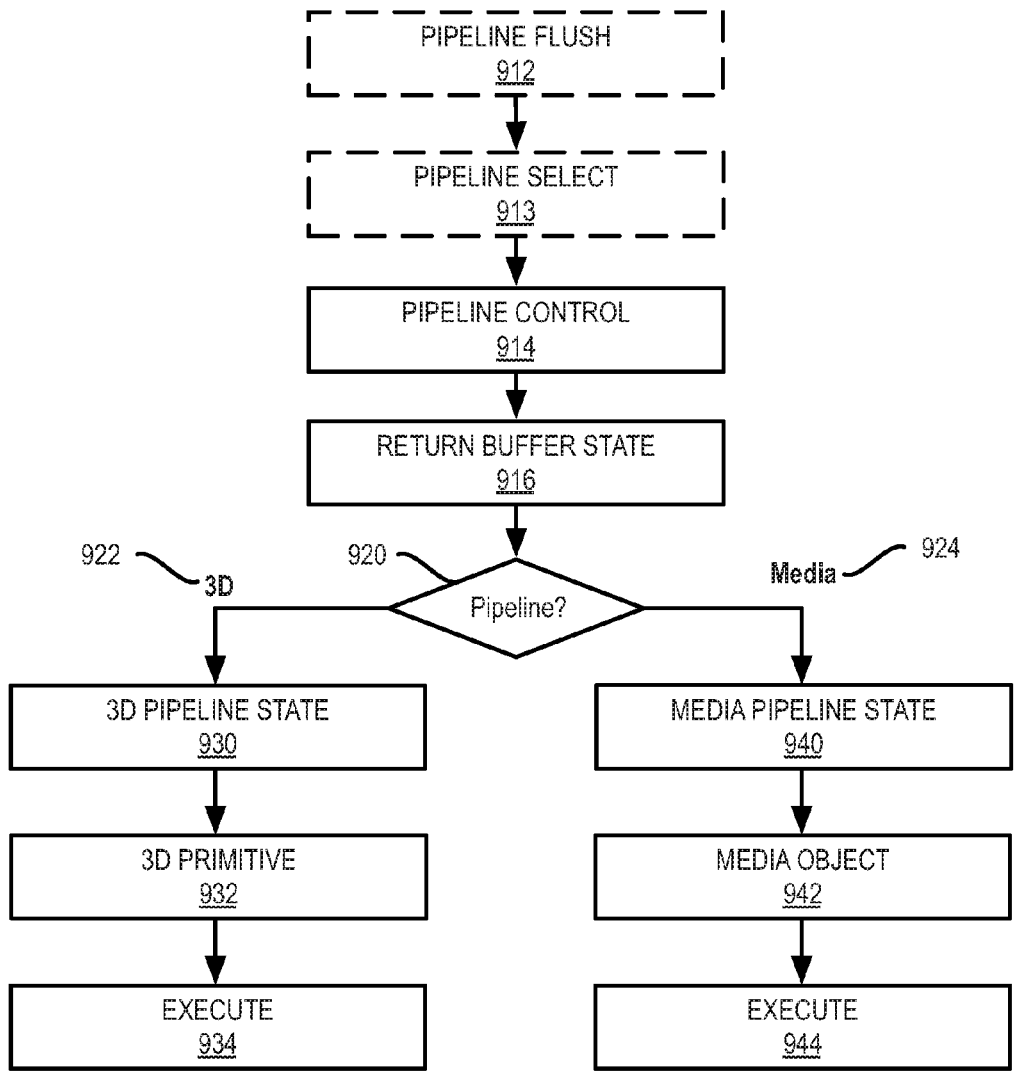
FIG. 9A is a block diagram illustrating a graphics processor command format according to an embodiment.
FIG. 9B is a block diagram illustrating a graphics processor command sequence according to an embodiment.

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
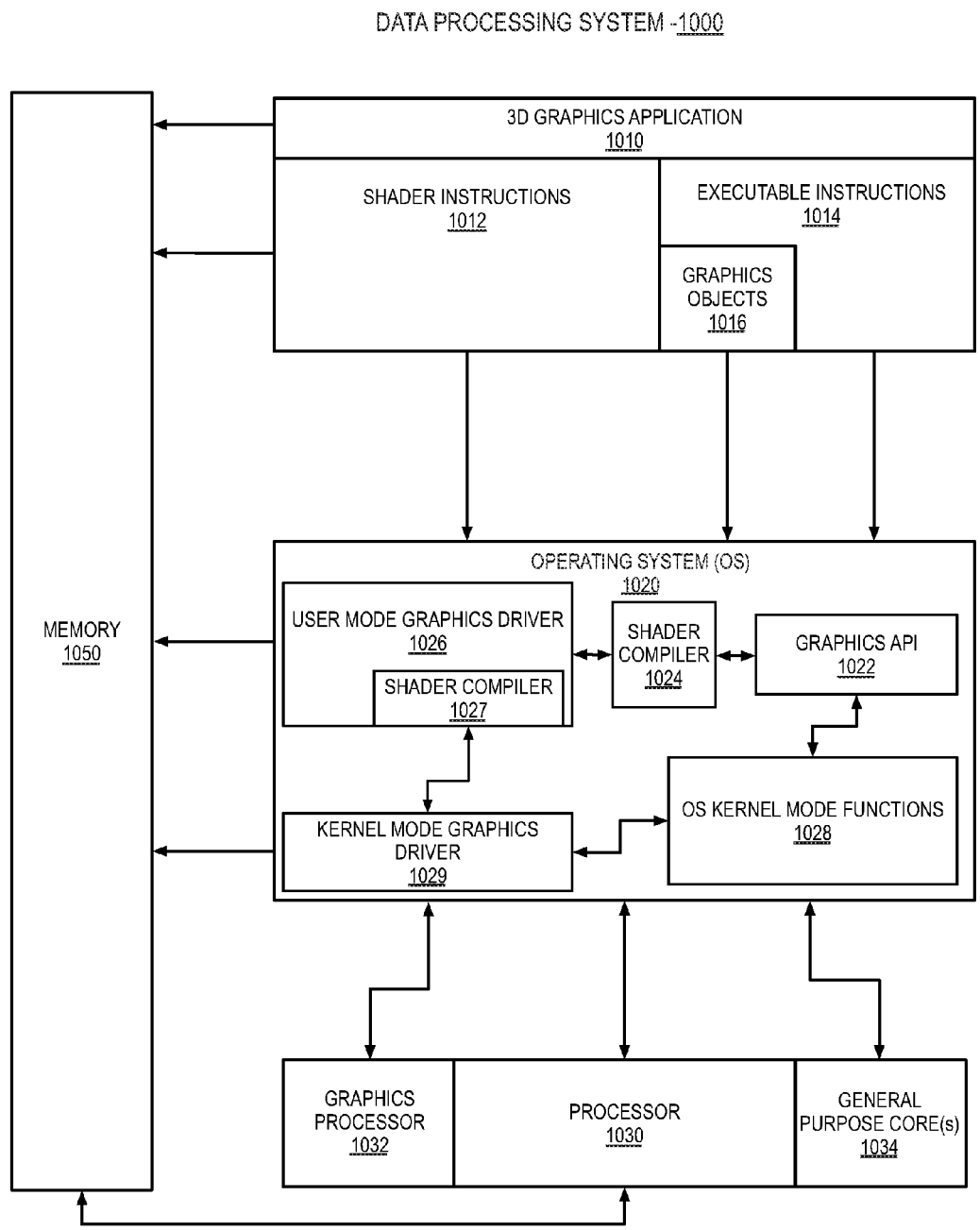
FIG. 10 illustrates exemplary graphics software architecture for a data processing system according to some embodiments.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034.

The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API. In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
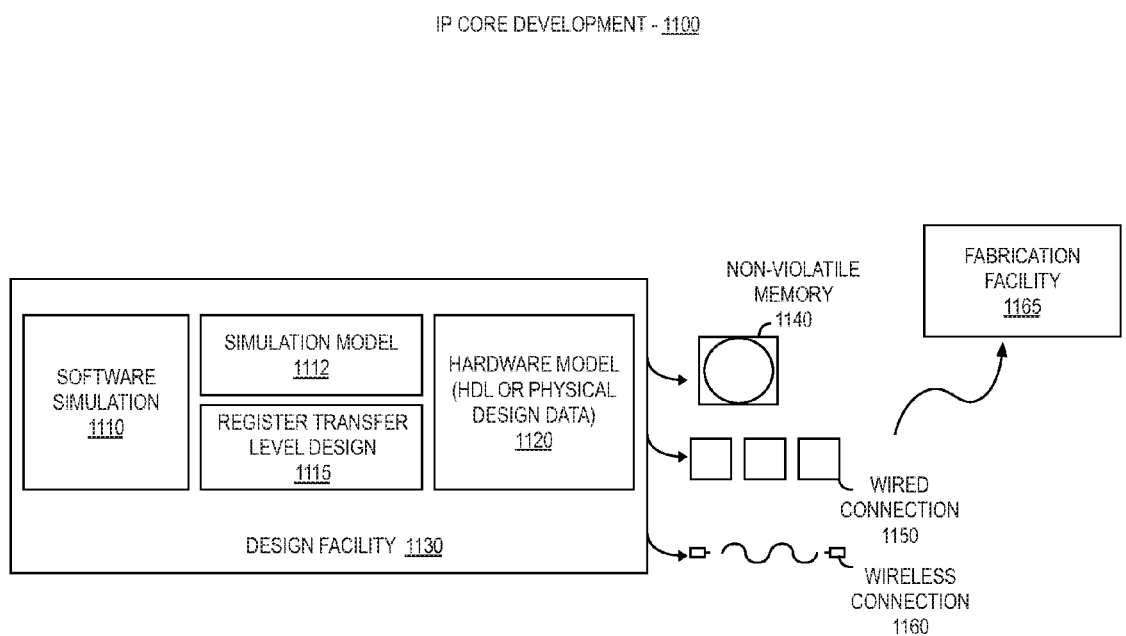
FIG. 11 is a block diagram illustrating an IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design.

The fabricated integrated circuit can be configured to perform operations in accordance with at least one embodiment described herein.

Exemplary System on a Chip Integrated Circuit

Figure 12:
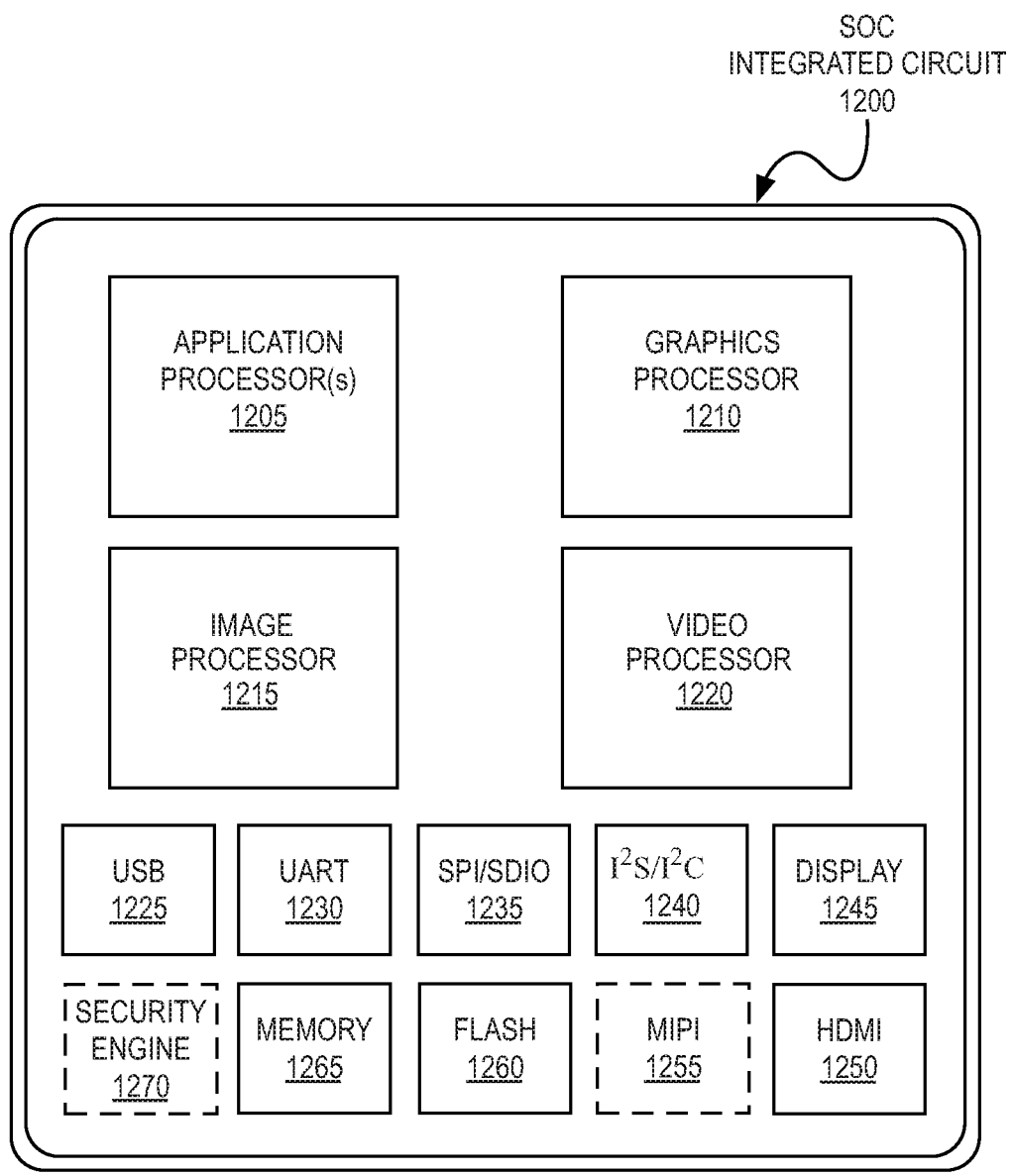
FIG. 12 is a block diagram illustrating an exemplary system on a chip integrated circuit that may be fabricated using one or more IP cores, according to an embodiment.
Figure 13:
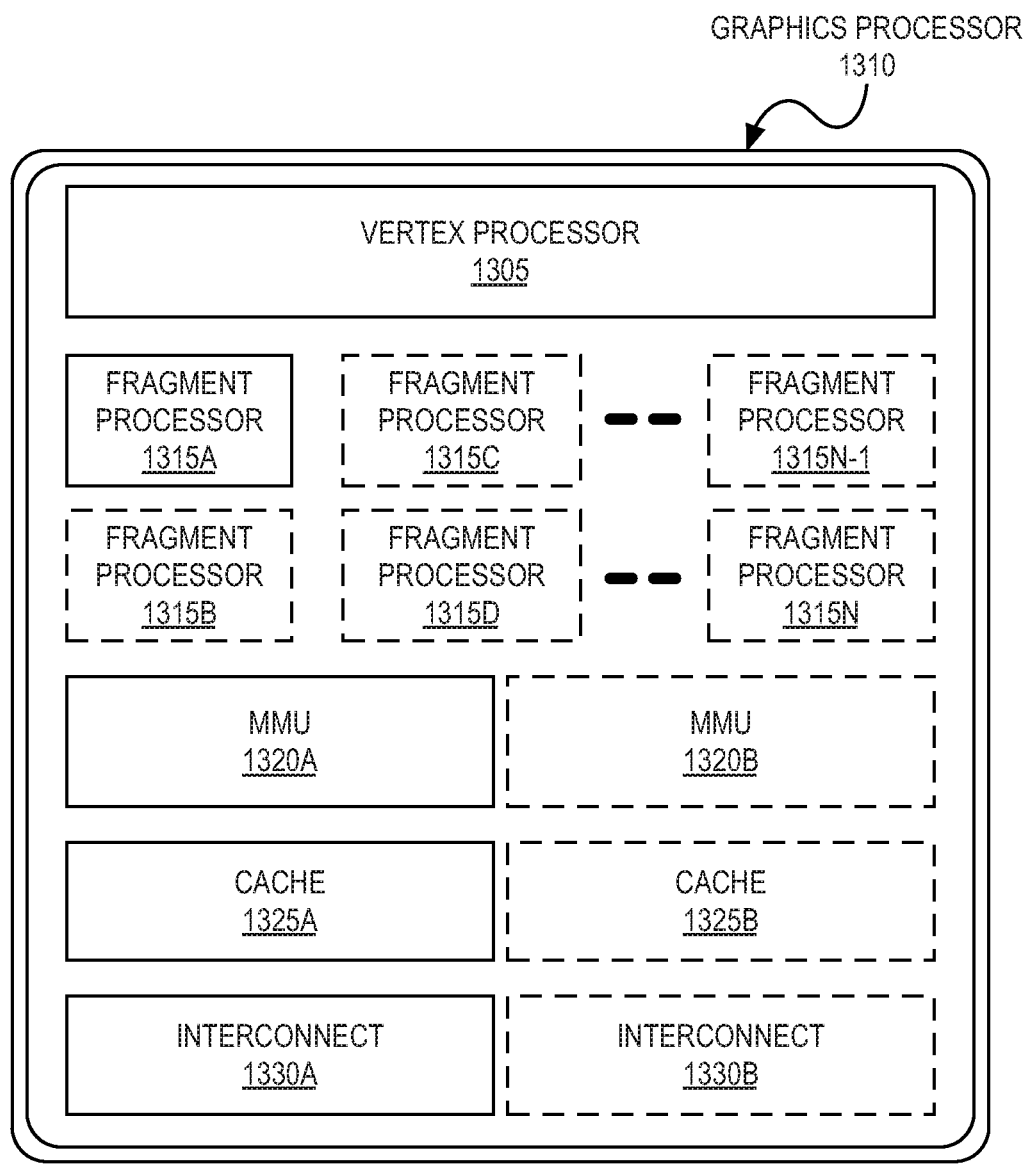
FIG. 13 is a block diagram illustrating an exemplary graphics processor of a system on a chip integrated circuit that may be fabricated using one or more IP cores, according to an embodiment.
Figure 14:
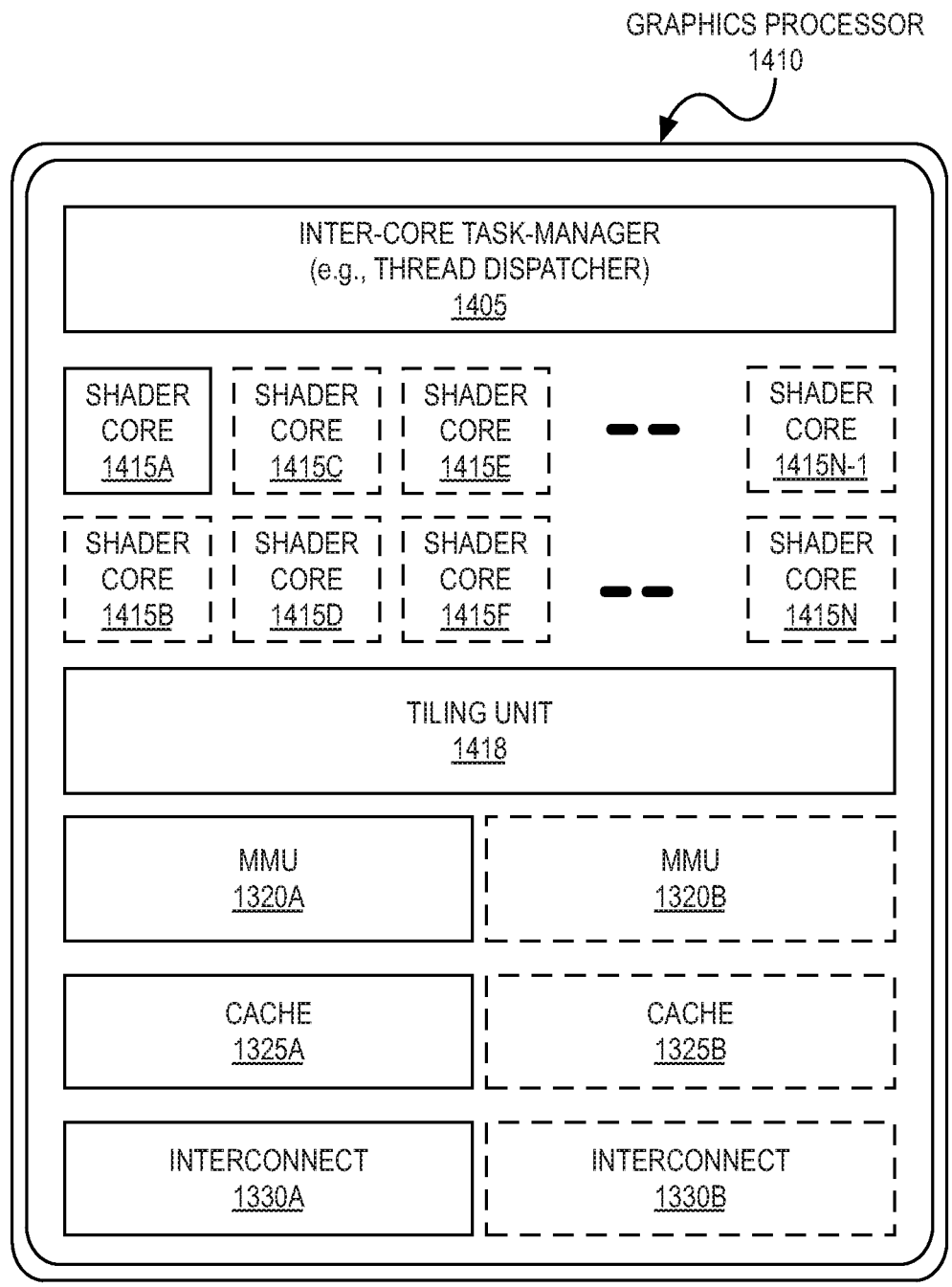
FIG. 14 is a block diagram illustrating an additional exemplary graphics processor of a system on a chip integrated circuit that may be fabricated using one or more IP cores, according to an embodiment.

FIGS. 12-14 illustrated exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I²S/I²C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

FIG. 13 is a block diagram illustrating an exemplary graphics processor 1310 of a system on a chip integrated circuit that may be fabricated using one or more IP cores, according to an embodiment. Graphics processor 1310 can be a variant of the graphics processor 1210 of FIG. 12. Graphics processor 1310 includes a vertex processor 1305 and one or more fragment processor(s) 1315A1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for integrated circuit 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1325A-1325B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

FIG. 14 is a block diagram illustrating an additional exemplary graphics processor 1410 of a system on a chip integrated circuit that may be fabricated using one or more IP cores, according to an embodiment. Graphics processor 1410 can be a variant of the graphics processor 1210 of FIG. 12. Graphics processor 1410 includes the one or more MMU(s) 1320A-1320B, caches 1325A-1325B, and circuit interconnects 1330A-1330B of the integrated circuit 1300 of FIG. 13.

Graphics processor 1410 includes one or more shader core(s) 1415A-1415N (e.g., 1415A, 1415B, 1415C, 1415D, 1415E, 1415F, through 1315N-1, and 1315N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1410 includes an inter-core task manager 1405, which acts as a thread dispatcher to dispatch execution threads to one or more shader cores 1415A-1415N and a tiling unit 1418 to accelerate tiling operations for tile-based rendering, in which rendering operations for a scene are subdivided in image space, for example to exploit local spatial coherence within a scene or to optimize use of internal caches.

Figure 15:
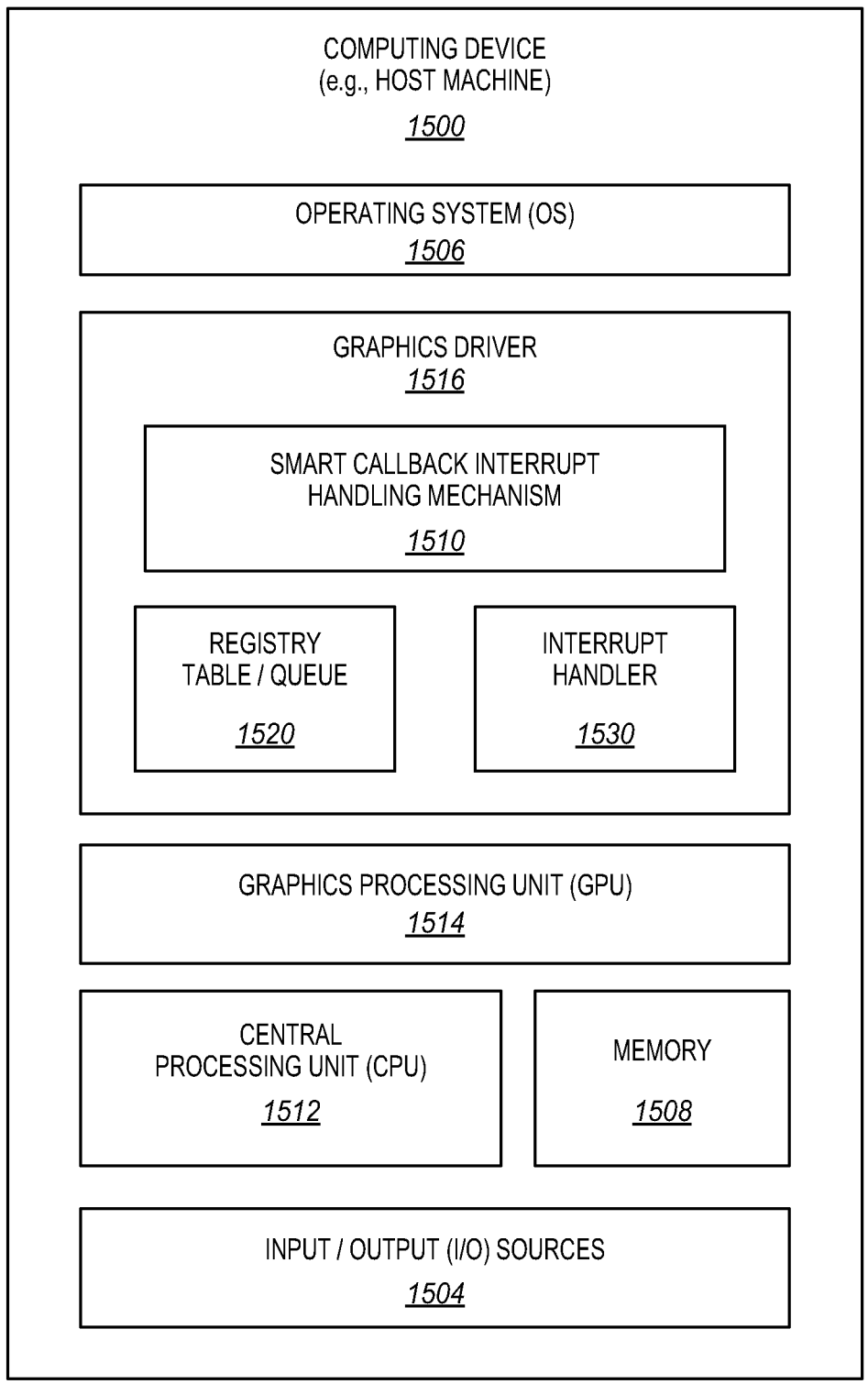
FIG. 15 illustrates a computing device employing a smart callback interrupt handling mechanism according to one embodiment.

FIG. 15 illustrates a computing device 1500 employing a smart callback interrupt handling mechanism ("interrupt mechanism") 1510 according to one embodiment. Computing device 1500 (e.g., smart wearable devices, virtual reality (VR) devices, head-mounted display (HMDs), mobile computers, Internet of Things (IoT) devices, laptop computers, desktop computers, server computers, etc.) may be the same as data processing system 100 of FIG. 1 and accordingly, for brevity, clarity, and ease of understanding, many of the details stated above with reference to FIGS. 1-14 are not further discussed or repeated hereafter. As illustrated, in one embodiment, computing device 1500 is shown as hosting interrupt mechanism 1510.

In the illustrated embodiment, interrupt mechanism 1510 is shown as being hosted by graphics driver 1516; however, it is contemplated that embodiments are not limited as such. For example, in one embodiment, interrupt mechanism 1510 may be part of firmware of graphics processing unit ("GPU" or "graphics processor") 1514 or central processing unit ("CPU" or "application processor") 1512, in another embodiment, hosted by operating system 1506. In yet another embodiment, interrupt mechanism 1510 may be a hardware component hosted by GPU 1514 or CPU 1512. In yet another embodiment, interrupt mechanism 1510 may be partially and simultaneously hosted by multiple components of computing device 1500, such as one or more of graphics driver 1516, GPU 1514, GPU firmware, CPU 1512, CPU firmware, operating system 1506, and/or the like. Further, graphics driver 1516 is shown as hosting registry table 1520 and GPU interrupt handler 1530.

It is contemplated and to be noted that interrupt mechanism 1510 is not merely applicable to or usable with graphics memory buffer or workloads having tasks relating to GPU 1514 and that it is equally applicable to or usable with any other memory buffers or workloads having tasks, such as relating to CPU 1512 and/or any number and type of other components of computing device 1500. However, for the sake of brevity and clarity, throughout this document, interrupt mechanism 1510 is described with reference to graphics buffers but it is to be noted that embodiments are not limited as such.

Throughout the document, term "user" may be interchangeably referred to as "viewer", "observer", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

Computing device 1500 may include any number and type of communication devices, such as large computing systems, such as server computers, desktop computers, etc., and may further include set-top boxes (e.g., Internet-based cable television set-top boxes, etc.), global positioning system (GPS)-based devices, etc. Computing device 1500 may include mobile computing devices serving as communication devices, such as cellular phones including smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, computing device 1500 may include a mobile computing device employing a computer platform hosting an integrated circuit ("IC"), such as system on a chip ("SoC" or "SOC"), integrating various hardware and/or software components of computing device 1500 on a single chip.

As illustrated, in one embodiment, computing device 1500 may include any number and type of hardware and/or software components, such as (without limitation) GPU 1514, graphics driver (also referred to as "GPU driver", "graphics driver logic", "driver logic", user-mode driver (UMD), UMD, user-mode driver framework (UMDF), UMDF, or simply "driver") 1516, CPU 1512, memory 1508, network devices, drivers, or the like, as well as input/output (I/O) sources 1504, such as touchscreens, touch panels, touch pads, virtual or regular keyboards, virtual or regular mice, ports, connectors, etc. Computing device 1500 may include operating system (OS) 1506 serving as an interface between hardware and/or physical resources of the computer device 1500 and a user. It is contemplated that CPU 1512 may include one or more processors, such as processor(s) 102 of FIG. 1, while GPU 1514 may include one or more graphics processors, such as graphics processor(s) 108 of FIG. 1.

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

It is contemplated and as further described with reference to FIGS. 1-12, some processes of the graphics pipeline as described above are implemented in software, while the rest are implemented in hardware. A graphics pipeline may be implemented in a graphics coprocessor design, where CPU 1512 is designed to work with GPU 1514 which may be included in or co-located with CPU 1512. In one embodiment, GPU 1514 may employ any number and type of conventional software and hardware logic to perform the conventional functions relating to graphics rendering as well as novel software and hardware logic to execute any number and type of instructions, such as instructions 121 of FIG. 1, to perform the various novel functions of interrupt mechanism 1510 as disclosed throughout this document.

As aforementioned, memory 1508 may include a random access memory (RAM) comprising application database having object information. A memory controller hub, such as memory controller hub 116 of FIG. 1, may access data in the RAM and forward it to GPU 1514 for graphics pipeline processing. RAM may include double data rate RAM (DDR RAM), extended data output RAM (EDO RAM), etc. CPU 1512 interacts with a hardware graphics pipeline, as illustrated with reference to FIG. 3, to share graphics pipelining functionality. Processed data is stored in a buffer in the hardware graphics pipeline, and state information is stored in memory 1508. The resulting image is then transferred to I/O sources 1504, such as a display component, such as display device 320 of FIG. 3, for displaying of the image. It is contemplated that the display device may be of various types, such as Cathode Ray Tube (CRT), Thin Film Transistor (TFT), Liquid Crystal Display (LCD), Organic Light Emitting Diode (OLED) array, etc., to display information to a user.

Memory 1508 may comprise a pre-allocated region of a buffer (e.g., frame buffer); however, it should be understood by one of ordinary skill in the art that the embodiments are not so limited, and that any memory accessible to the lower graphics pipeline may be used. Computing device 1500 may further include input/output (I/O) control hub (ICH) 150 as referenced in FIG. 1, one or more 1/0 sources 1504, etc.

CPU 1512 may include one or more processors to execute instructions in order to perform whatever software routines the computing system implements. The instructions frequently involve some sort of operation performed upon data. Both data and instructions may be stored in system memory 1508 and any associated cache. Cache is typically designed to have shorter latency times than system memory 1508; for example, cache might be integrated onto the same silicon chip(s) as the processor(s) and/or constructed with faster static RAM (SRAM) cells whilst the system memory 1508 might be constructed with slower dynamic RAM (DRAM) cells. By tending to store more frequently used instructions and data in the cache as opposed to the system memory 1508, the overall performance efficiency of computing device 1500 improves. It is contemplated that in some embodiments, GPU 1514 may exist as part of CPU 1512 (such as part of a physical CPU package) in which case, memory 1508 may be shared by CPU 1512 and GPU 1514 or kept separated.

System memory 1508 may be made available to other components within the computing device 1500. For example, any data (e.g., input graphics data) received from various interfaces to the computing device 1500 (e.g., keyboard and mouse, printer port, Local Area Network (LAN) port, modem port, etc.) or retrieved from an internal storage element of the computer device 1500 (e.g., hard disk drive) are often temporarily queued into system memory 1508 prior to their being operated upon by the one or more processor(s) in the implementation of a software program. Similarly, data that a software program determines should be sent from the computing device 1500 to an outside entity through one of the computing system interfaces, or stored into an internal storage element, is often temporarily queued in system memory 1508 prior to its being transmitted or stored.

Further, for example, an ICH, such as ICH 150 of FIG. 1, may be used for ensuring that such data is properly passed between the system memory 1508 and its appropriate corresponding computing system interface (and internal storage device if the computing system is so designed) and may have bi-directional point-to-point links between itself and the observed I/O sources/devices 1504. Similarly, an MCH, such as MCH 116 of FIG. 1, may be used for managing the various contending requests for system memory 1508 accesses amongst CPU 1512 and GPU 1514, interfaces and internal storage elements that may proximately arise in time with respect to one another.

I/O sources 1504 may include one or more I/O devices that are implemented for transferring data to and/or from computing device 1500 (e.g., a networking adapter); or, for a large scale non-volatile storage within computing device 1500 (e.g., hard disk drive). User input device, including alphanumeric and other keys, may be used to communicate information and command selections to GPU 1514. Another type of user input device is cursor control, such as a mouse, a trackball, a touchscreen, a touchpad, or cursor direction keys to communicate direction information and command selections to GPU 1514 and to control cursor movement on the display device. Camera and microphone arrays of computer device 1500 may be employed to observe gestures, record audio and video and to receive and transmit visual and audio commands.

Computing device 1500 may further include network interface(s) to provide access to a network, such as a LAN, a wide area network (WAN), a metropolitan area network (MAN), a personal area network (PAN), Bluetooth, a cloud network, a mobile network (e.g., $3^{rd}$ Generation (3G), $4^{th}$ Generation (4G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing device 1500 may vary from implementation to implementation depending upon numerous factors, such as price constraints, performance requirements, technological improvements, or other circumstances. Examples of the electronic device or computer system 1500 may include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Figure 16:
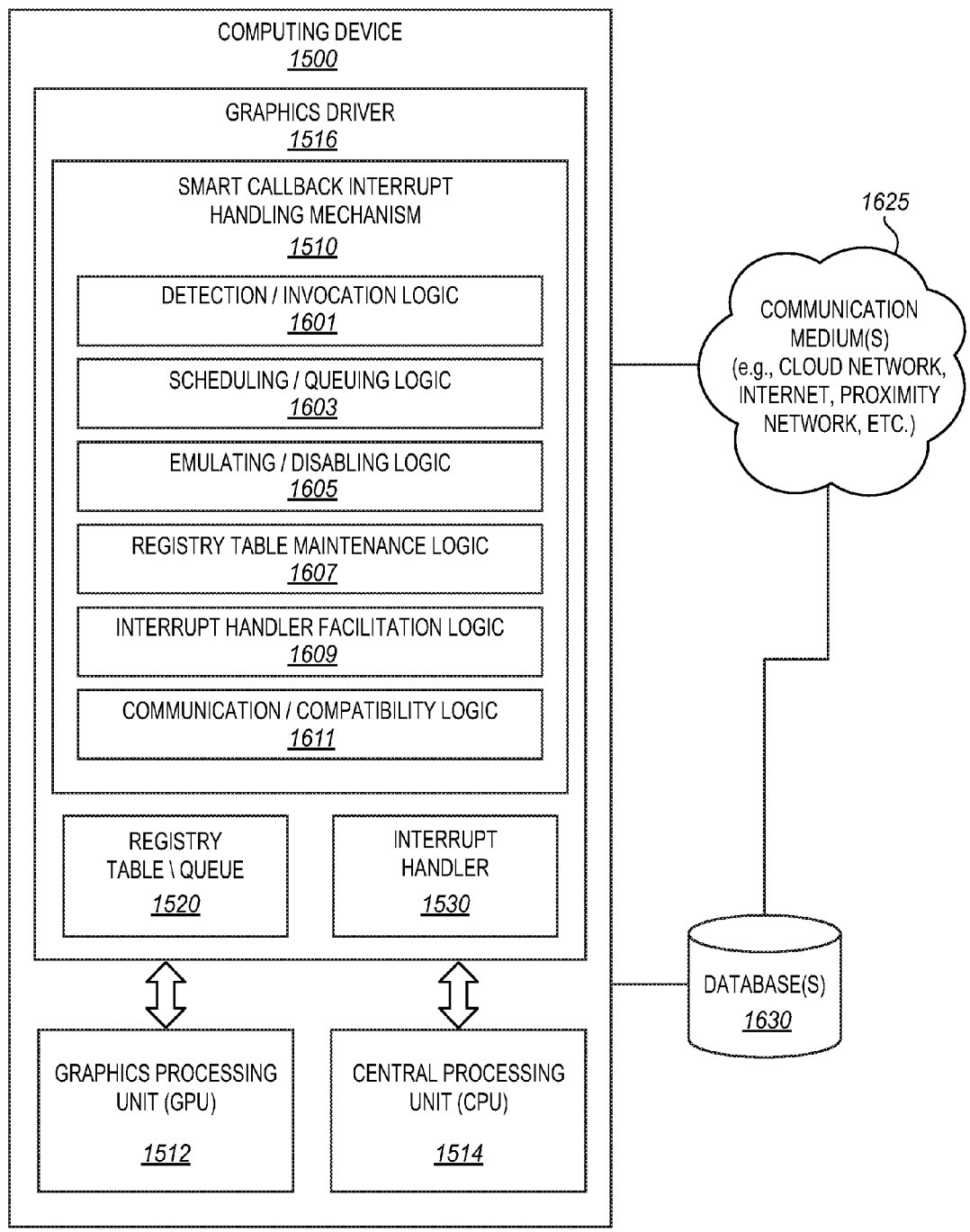
FIG. 16 illustrates a smart callback interrupt handling mechanism according to one embodiment.

FIG. 16 illustrates interrupt mechanism 1510 of FIG. 15 according to one embodiment. For brevity, many of the details already discussed with reference to FIGS. 1-15 are not repeated or discussed hereafter. In one embodiment, graphics driver 1516 may host interrupt mechanism 1510 having any number and type of components, such as (without limitations): detection/invocation logic 1601; scheduling/queuing logic 1603; emulating/disabling logic 1605; registry table maintenance logic 1607; interrupt handler facilitation logic 1609; and communication/compatibility logic 1611. In one embodiment, graphics driver 1516 is shown as hosting registry table 1520 and GPU interrupt handler 1530.

Computing device 1500 is further shown to be in communication with one or more repositories, datasets, and/or databases, such as database(s) 1630 (e.g., cloud storage, non-cloud storage, etc.), where database(s) 1630 may reside at a local storage or a remote storage over communication medium(s) 1625, such as one or more networks (e.g., cloud network, proximity network, mobile network, intranet, Internet, etc.).

It is contemplated that a software application running at computing device 1500 may be responsible for performing or facilitating performance of any number and type of tasks using one or more components (e.g., GPU 1514, graphics driver 1516, CPU 1512, etc.) of computing device 1500. When performing such tasks, as defined by the software application, one or more components, such as GPU 1514, graphics driver 1516, CPU 1512, etc., may communicate with each other to ensure accurate and timely processing and completion of the tasks. Embodiments provides for interrupt mechanism 1510 to emulate GPU callback interrupts that enable multiple CPU threads to asynchronously issue tasks to GPU 1514, where each CPU thread may be individually signaled when its issued task is completed without blocking other threads from issuing additional tasks to GPU 1514. In one embodiment, issuing of a task may include invoking an API of a graphics driver, such as graphics driver 1516, such that the API includes a thread ID referencing a thread.

For example, a CPU thread associate with CPU 1512 may issue a task to GPU 1514 through an application programming interface ("API" or "user interface") call to graphics driver 1516. In one embodiment, this task may be detected by detection/invocation logic 1601 along with any additional information associated with the task for identifying the CPU thread, where, for example, the API call may include this additional information, such as a thread ID, a pointer to a callback function, etc. Once the task is sent, the CPU thread may continue with performing other tasks while waiting on a signal at a point when it needs any computation results from GPU 1512 to proceed.

In one embodiment, for tasks received by graphics driver 1516, each task may be queued or scheduled by graphics driver 1516 as facilitated by scheduling/queuing logic 1603 and correspondingly, registry table 1520 may be updated to keep track of each thread ID and each callback function pointer associated with each pending task. In one embodiment, registry table 1520 may be updated by registry table maintenance logic 1607. Further, registry table or queue 1520 may be hosted or supported by graphics driver 1516 as facilitated by registry table maintenance logic 1607, where registry table 1520 may reside at CPU/GPU memory associated with CPU 1512 and/or GPU 1514.

When one or more tasks complete, in one embodiment, registry table maintenance logic 1607 may be used to inspect and update registry table 1520, while encapsulating the thread IDs and callback function pointers of all completed tasks into a single posted write transaction and sending the transaction to CPU 1512 as an emulated message signaled interrupt ("MSI" or "MSI interrupt") with data using emulating/disabling logic 1605.

In one embodiment, upon receiving the MSI with data, interrupt handler 1530 may then inspect thread IDs from its interrupt data field and for each thread ID, interrupt handler 1530 may signal (or wake up) the CPU thread associated with the thread ID and passes the callback function pointer associated with the thread ID to the CPU thread. In on embodiment, the CPU thread may then invoke a callback function using the received callback function pointer. In one embodiment, interrupt handler 1530 may be facilitated to perform any number of operations, such as the aforementioned tasks, as well as other tasks supported and maintained by interrupt handler facilitation logic 1609.

In one embodiment, interrupt mechanism 1510 enables multiple CPU threads to asynchronously issue tasks to a common GPU resource without the need to lock the GPU resources using dedicated locks and semaphores. This novel technique simplifies coding and thread management for multi-threaded CPU-GPU applications.

In one embodiment, interrupt mechanism 1510 enables multiple CPU threads-issued tasks to be queued at GPU 1514, using registry table 1520 and as facilitated by scheduling/queuing logic 1603, for better tasks management and overall performance improvement.

In one embodiment, interrupt mechanism 1510 enables CPU threads to asynchronously issue tasks to a common GPU resource and facilitate each CPU thread to individually wait on a signal for computation results to be returned without blocking other threads from issuing tasks to GPU 1514. This novel technique increases overall system performance.

In one embodiment, interrupt mechanism 1510 invokes a callback function of the same CPU thread when a GPU computation result becomes available and thus the callback function may have the same thread scheduling priority as the original CPU thread that issued the GPU task, where the scheduling is facilitated by scheduling/queuing logic 1603. This novel technique prevents CPU threads priority inversion for multi-threaded applications.

In one embodiment, interrupt mechanism 1510 enables interrupt coalescing by combining interrupts from multiple GPU-computed tasks into a single CPU interrupt using interrupt handler 1530 as facilitated by interrupt handler facilitation logic 1609. This single CPU interrupt is capable of waking up multiple CPU threads that are waiting on their respective GPU tasks completion events as facilitated by interrupt handler 1530. This novel technique reduces the number of CPU interrupts and increases overall system performance.

In one embodiment, when CPU 1512 needs to issue a task to GPU 1514, a CPU thread associated with CPU 1512 may invoke an API call of graphics driver 1516 to issue the task to be performed by GPU 1514. This API call may be detected or facilitated by detection/invocation logic 1601 and placed through a graphics driver API that may include additional relevant fields, such as one for a thread ID and another for a pointer to a callback function. In one embodiment, once the request for the task is received at graphics driver 1516, as facilitated by detection/invocation logic 1601, it may then be scheduled or queued by scheduling/queuing logic 1603 using registry table/queue 1520 so that the task may be performed timely and completely.

After the task is issued to GPU 1514, the CPU thread may perform other tasks or wait on a signal at the point when it needs the computation results from GPU 1514. For example, if other existing or new tasks are not dependent upon or pertinent to the requested task, then the CPU thread may begin or continue with other existing or new tasks; otherwise, the CPU thread may wait to receive a signal or notification from GPU 1514 as facilitated by interrupt handler facilitation logic 1607 using interrupt handler 1530, where the signal indicates the status, such as completion, of the requested task. In one embodiment, interrupt handler facilitation logic 1607 is further to use interrupt handler 1530 to provide to CPU 1512 or the CPU thread any pertinent computation results relating to completed task. Any values of entities, such as the thread ID, the callback function pointer, the memory pointer, and the flag, etc., and computational results relating to the task may be separately or collectively provided to CPU 1512 or the CPU thread as task values. For example, interrupt handler 1530 may cause the CPU thread referencing the thread ID to wake up and subsequently, invoke a callback function of the CPU thread referencing the callback function pointer, and pass the memory pointer referencing a memory location that stores the computation results of completed task as input to the callback function. In some embodiment, a second CPU thread may invoke the same API call to GPU driver 1516 to issue additional tasks to GPU 1514 using the aforementioned processes.

As aforementioned, upon GPU 1514 receiving the task request from the CPU thread, the requested task is scheduled or queued by scheduling/queuing logic 1603, while registry table/queue 1520 is updated, as facilitated by registry table maintenance logic 1607, to keep track of the task and its corresponding thread ID and callback function pointer. It is contemplated that the task is scheduled or queued to be processed or performed by a GPU kernel of GPU 1514. Upon completion of the processing of the task by the GPU kernel, registry table maintenance logic 1607 may be triggered to update registry table/queue 1520 indicating the completion of the task. In one embodiment, as further illustrated with respect to FIG. 19A, updating registry table/queue 1520 may include one or more of (without limitation): 1) flagging of completed tasks (including the requested task) as done or completed; and 2) updating of memory pointers corresponding to completed tasks (including the requested task).

In one embodiment, emulating/disabling logic 1605 may then be triggered to emulate an MSI interrupt with data to CPU 1512 as described with reference to FIG. 17B, where emulated MSI interrupt data may contain the thread ID and the callback function pointer of the completed requested task. In some embodiments, interrupt data may also contain additional pointers to CPU memory locations or data structures that contain the GPU computation results for one or more tasks, including the completed requested task as further described with reference to FIG. 19B. Subsequently, emulating/disabling logic 1605 disables any interrupts, while GPU 1514 continues to process additional pending tasks while waiting for its MSI interrupt to be serviced.

Moreover, in one embodiment, when CPU 1512 receives the emulated MSI interrupt with data from GPU 1514, CPU 1512 may trigger detection/invocation logic 1601 to invoke interrupt handler 1530 of GPU driver 1516. Upon invocation, interrupt handler facilitating logic 1609 may be facilitated by interrupt handler 1530 to perform one or more of (without limitation): 1) inspect thread IDs in their interrupt data fields as further illustrated with respect to FIG. 19B; and 2) for each thread ID, a) signal and wake up the CPU thread, and b) pass the associated callback function pointer and any other memory pointers to the CPU thread. Further, registry table maintenance logic 1607 be facilitated by interrupt handler 1530 to update registry table/queue 1520 by removing tasks that are marked completed (such as "done", "completed", or "finished") by invalidating entries of registry table/queue 1520 with marked completion (e.g., "done") or removing competed tasks (e.g., "done" tasks) from registry table/queue 1520 to free up the space associated with these registry table/queue entries for new tasks. In one embodiment, emulating/disabling logic 1605 may then be triggered to re-enable GPU interrupts.

Further, in one embodiment, one or more CPU threads, including the CPU thread, may receive a signal, as facilitated by interrupt handler facilitation logic 1607 using interrupt handler 1530, and invoke, as facilitated by detection/invocation logic 1601, a callback function to process their respective GPU computation results with the same thread scheduling priority as the parent thread that issued the GPU task. In one embodiment, callback function may utilize any memory pointers received as input from interrupt handler facilitation logic 1609 to access computation results stored in memory 1508 of FIG. 15 through further processing.

Communication/compatibility logic 1611 may be used to facilitate dynamic communication and compatibility between computing device 1500 and any number and type of other computing devices (such as mobile computing device, desktop computer, server computing device, etc.); processing devices or components (such as CPUs, GPUs, etc.); capturing/sensing/detecting devices (such as capturing/sensing components including cameras, depth sensing cameras, camera sensors, red green blue (RGB) sensors, microphones, etc.); display devices (such as output components including display screens, display areas, display projectors, etc.); user/context-awareness components and/or identification/verification sensors/devices (such as biometric sensors/detectors, scanners, etc.); database(s) 1630, such as memory or storage devices, databases, and/or data sources (such as data storage devices, hard drives, solid-state drives, hard disks, memory cards or devices, memory circuits, etc.); communication medium(s) 1625, such as one or more communication channels or networks (e.g., Cloud network, the Internet, intranet, cellular network, proximity networks, such as Bluetooth, Bluetooth low energy (BLE), Bluetooth Smart, Wi-Fi proximity, Radio Frequency Identification (RFID), Near Field Communication (NFC), Body Area Network (BAN), etc.); wireless or wired communications and relevant protocols (e.g., Wi-Fi®, WiMAX, Ethernet, etc.); connectivity and location management techniques; software applications/websites (e.g., social and/or business networking websites, etc., business applications, games and other entertainment applications, etc.); and programming languages, etc., while ensuring compatibility with changing technologies, parameters, protocols, standards, etc.

Throughout this document, terms like "logic", "component", "module", "framework", "engine", "mechanism", and the like, may be referenced interchangeably and include, by way of example, software, hardware, and/or any combination of software and hardware, such as firmware. In one example, "logic" may refer to or include a software component that is capable of working with one or more of an operating system (e.g., operating system 1506), a graphics driver (e.g., graphics driver 1516), etc., of a computing device, such as computing device 1500. In another example, "logic" may refer to or include a hardware component that is capable of being physically installed along with or as part of one or more system hardware elements, such as an application processor (e.g., CPU 1512), a graphics processor (e.g., GPU 1514), etc., of a computing device, such as computing device 1500. In yet another embodiment, "logic" may refer to or include a firmware component that is capable of being part of system firmware, such as firmware of an application processor (e.g., CPU 1512) or a graphics processor (e.g., GPU 1514), etc., of a computing device, such as computing device 1500.

Further, any use of a particular brand, word, term, phrase, name, and/or acronym, such as "GPU", "GPU domain", "GPGPU", "CPU", "CPU domain", "graphics driver", "workload", "application", "frame", "work unit", "draw", "dispatch", "API", "hardware", "software", "agent", "graphics driver", "kernel mode graphics driver", "user-mode driver", "user-mode driver framework", "buffer", "graphics buffer", "allocation component", "allocation driver", "composition buffer", "purge" or "purging", "realize" or "realizing", "task", "operation", "software application", "game", etc., should not be read to limit embodiments to software or devices that carry that label in products or in literature external to this document.

It is contemplated that any number and type of components may be added to and/or removed from interrupt mechanism 1510 to facilitate various embodiments including adding, removing, and/or enhancing certain features. For brevity, clarity, and ease of understanding of interrupt mechanism 1510, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 17A:
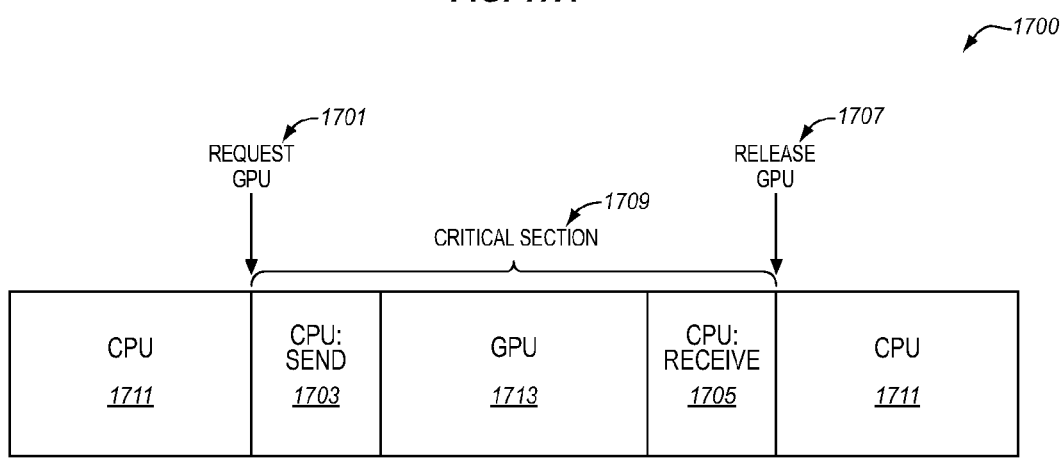
FIG. 17A illustrates execution phases according to one embodiment.

FIG. 17A illustrates execution phases 1700 according to one embodiment. The illustrated execution phases 1700 provide for a transaction sequence of a GPU-using job. As illustrated, a CPU thread associated with CPU 1711 places a job request with GPU 1713, such as request GPU at 1701, when then leads to the tasks being sent to GPU at 1703. For multi-threaded CPU-GPU applications, the CPU thread requests for GPU resources by acquiring a lock or by entering a critical code section at 1709 before it issues the task to GPU at 1703.

Upon receiving the task, GPU 1703 then processes the task and interrupts CPU 1711 after the task is completed, causing CPU 1711 to spawn one or more deferred-work threads or tasks to handle the computation results returned by GPU 1713 to CPU 1711. GPU resources are then released (e.g., unlocked) at 1707 after CPU 1711 receives an interrupt at 1711 and the task is completed to enable other CPU threads to issue additional tasks to GPU 1713.

Figure 17B:
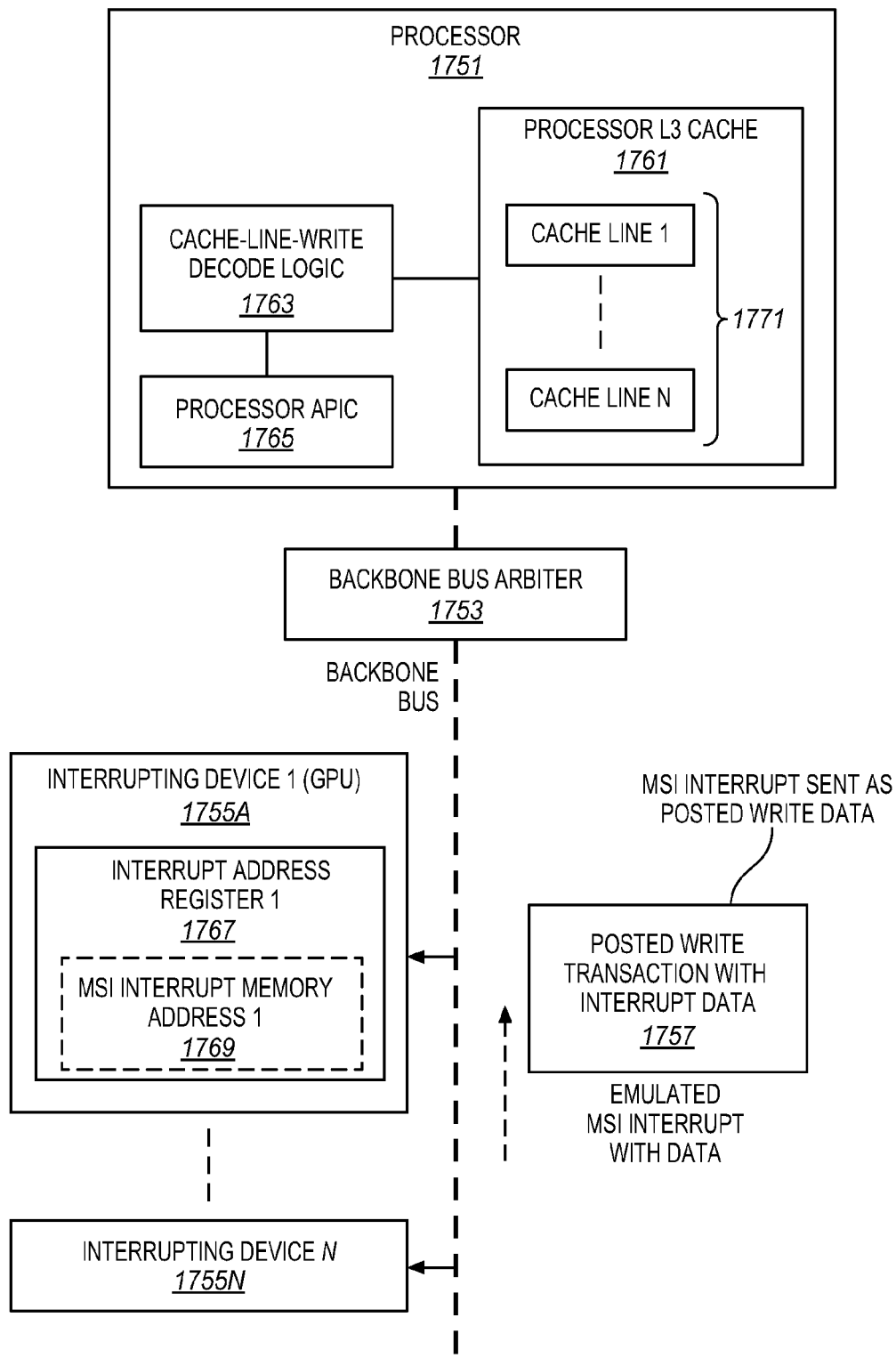
FIG. 17B illustrates an architectural placement for emulated MSI interrupt with data according to one embodiment.

FIG. 17B illustrates an architectural placement 1750 for emulated MSI interrupt with data according to one embodiment. For brevity, many of the details discussed previously discussed with reference to FIGS. 1-17A may not be discussed or repeated hereafter. Further, it is contemplated and to be noted that embodiments are not limited to any particular architectural setup or placement of components, such as architectural placement 1750.

As illustrated, architectural placement 1750 provides for an architectural block for emulated MSI interrupt with data. For example, processor 1751 pre-allocated and locks down an L3 cache line entry, such as cache lines 1-N 1771, for each interrupt-enabled devices 1755A-N, such as a GPU device, through backbone bus arbiter 1753, and maps the pre-allocated cache line addresses, cache lines 1-N 1771, of processor L3 cache 1761 to a pre-defined MSI interrupt memory address for each interrupt-enabled devices 1755A-N, where the MSI interrupt memory address is written to interrupt address registers of interrupting devices 1755A-N, such as interrupt address register 1 1767 of interrupting device 1 1755A, where interrupt address register 1 1767 includes MSI interrupt memory address 1 1769. Further, pre-allocated locked down cache lines may not be available for automatic cache line replacement in response to a processor cache line miss and only be available for MSI interrupt emulation purposes.

Further, any of interrupting devices 1755A-N that wants to emulate an MSI interrupt with data to processor 1751 may send from interrupting devices 1755A-N any specific interrupt data to processor 1751 by sending an interrupt vector and the interrupt data as a single posted write transactions, such as posted write transaction with interrupt data 1757, to MSI interrupt memory addresses at interrupting devices 1755A-N.

Further, as illustrated, configurable cache-line-write decode logic 1763 is coupled to the L3 cache of processor. When cache-line-write decode logic 1763 detects a write transaction to one of its pre-allocated locked down cache line (e.g., device-initiated direct cache access (DCA) write) or by snooping a cache line hit and performing a cache line fill operation as follows: 1) cache-line-write decode logic 1763 asserts emulated MSI interrupt signal to processor APIC 1765 and sends the cache line address to processor advanced programmable interrupt controller (APIC) 1765; 2) processor APIC 1765 obtains the interrupt vector from the cache line entry pointed to by the cache line address; 3) processor APIC 1765 invokes an interrupt handler referencing the interrupt vector; and 4) the interrupt handler obtains the interrupt data from the cache line entry pointed to by the cache line address and uses the interrupt vector and interrupt data to handle the interrupt.

Data written to a cache line entry may contain one or more interrupt vectors and other interrupt data, such as control and status register (CSR) values, direct memory access (DMA) buffer addresses, and messages or tags, etc., to assist processor 1751 in handling the MSI interrupt without having to obtain the same interrupt data through multiple I/O reads to interrupting devices 1755A-N.

Figure 18:
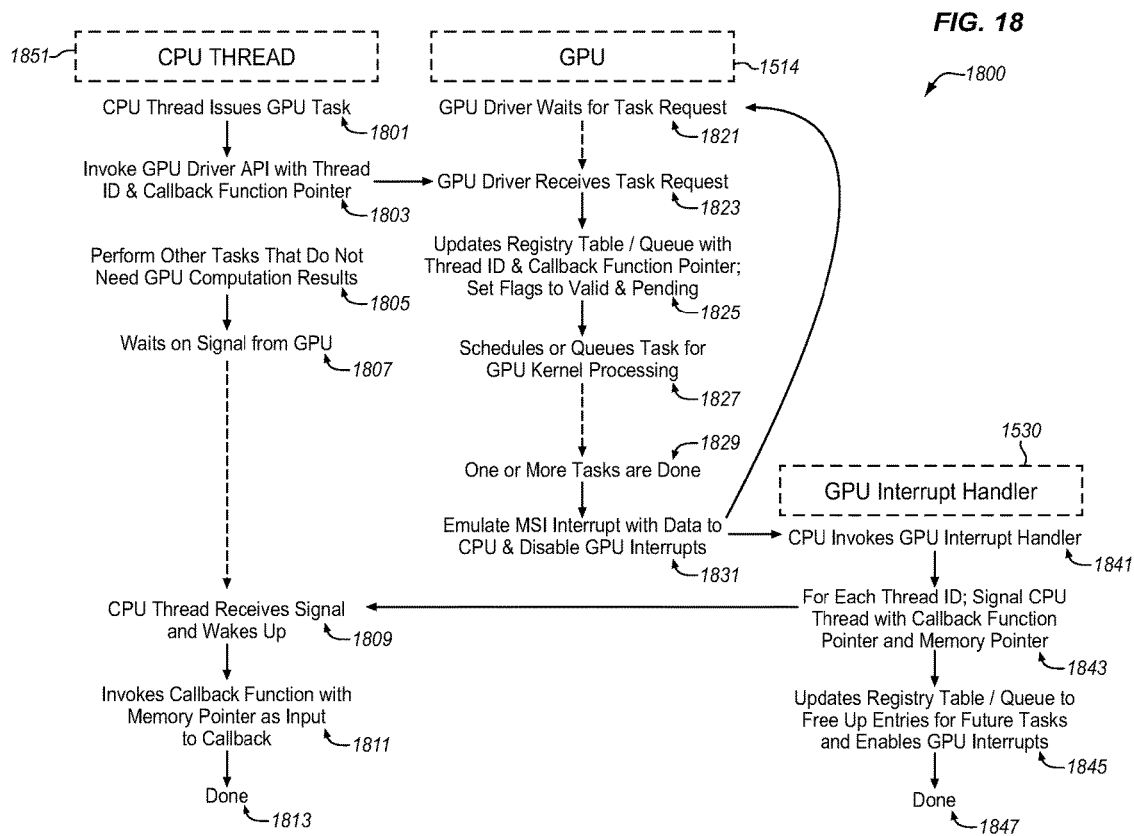
FIG. 18 illustrates a transaction sequence facilitating CPU-GPU callback interrupt handling for multi-threaded applications according to one embodiment.

FIG. 18 illustrates a transaction sequence 1800 facilitating CPU-GPU callback interrupt handling for multi-threaded applications according to one embodiment. Transaction sequence 1800 may be performed by processing logic that may comprise hardware (e.g., circuitry, dedicated logic, programmable logic, etc.), software (such as instructions run on a processing device), or a combination thereof, as facilitated by interrupt mechanism 1510 of FIG. 15. The processes of transaction sequence 1800 are illustrated in linear sequences for brevity and clarity in presentation; however, it is contemplated that any number of them can be performed in parallel, asynchronously, or in different orders. For brevity, many of the details discussed with reference to FIGS. 1-17B may not be discussed or repeated hereafter.

Transaction sequence 1800 begins with issuing of a GPU task at 1801 by CPU thread 1851 associated with a CPU in communication with GPU 1514 of a computing device, where GPU 1514 may include a graphics driver, such as graphics driver 1516 of FIG. 15. At 1803, a graphics driver API is invoked with a thread ID and/or a callback function pointer associated with the CPU thread and/or the task. In one embodiment, CPU thread 1851 may be used to perform other tasks that may not need GPU computation results at 1805 or, in another embodiment, at 1807, CPU thread 1851 may wait on signal from GPU 1514 before proceeding with other tasks or at least certain tasks, such as tasks that may be dependent on the requested GPU task.

In one embodiment, at GPU 1514, graphics driver waiting for receiving task requests at 1821 may then be invoked and receive the GPU task at 1823 from CPU thread 1851. In one embodiment, a registry table/queue at the graphics driver (such as registry table/queue 1520 of graphics driver 1516 of FIG. 15) may be updated with the thread ID and/or callback function pointer and set any flags to valid and/or pending at 1825 as further illustrated with reference to FIG. 19A. Further, using the registry table/queue, the request GPU task is then scheduled or queued for kernel processing at 1827. At 1829, one or more GPU tasks, including the requested GPU task, are done and, in one embodiment, an MSI interrupt with data to the CPU is emulated and any GPU interrupts are disabled at 1831. Further, an interrupt data field of MSI interrupt with data contains a thread ID, such as thread IDs 1 1903, N 1913 of FIG. 19A, associated with the completed task, and a memory pointer referencing a memory address location where computation results of the completed task is stored.

In one embodiment, at 1841, the CPU is facilitated to invoke GPU interrupt handler 1530 and, at 1843, interrupt handler inspects the thread ID in the interrupt data field and locates the registry table/queue entry associated with the completed task. Subsequently, for the thread ID, CPU thread 1851 is signaled with the corresponding callback function pointer (from the registry table/queue entry) and a memory pointer (from the interrupt data). This results in CPU thread 1851 receiving the signal and consequently, waking up at 1809, which, in turn, invokes the callback function with the memory pointer as input to callback at 1811. This ends the processes relating to CPU thread 1851 at 1813. Meanwhile, at GPU interrupt handler 1530, the registry table/queue is updated to free up entries for future tasks and enable GPU interrupts at 1845 and the processes end at 1847.

Further, with regard to how data may be returned by a GPU, such as GPU 1514, using an emulated MSI interrupt, it is contemplated any interrupt data may contain information to be used by a graphics driver to identify the registry table/queue entries associated with completed tasks along with memory addresses of stored computation results. For example, when a CPU invokes the GPU driver to schedule a task, a new table entry may be created having contained a thread ID of the task-issuing thread, such as CPU thread 1851. This thread ID can be further passed on to a GPU kernel by the graphics driver on behalf of GPU 1514 to keep track of which CPU thread, such as CPU thread 1851, may have scheduled the task. Thus, for example, when GPU 1514 is finished processing one or more tasks, it sends back to the CPU thread ID associated with the completed task by encapsulating the thread ID in the interrupt data filed of an emulated interrupt with data. Additional information, such as memory address of stored computation results, may also be included in the interrupt data field.

When the CPU received the emulated MSI interrupt, it invokes the interrupt handler, such as GPU interrupt handler 1530, interrupt handler 1530 inspects the thread ID in the interrupt data field to locate the registry table entry associated with the completed task. Further, interrupt handler 1530 may then proceed to read the callback function pointer from the registry table entry and signals CPU thread 1851 with the callback function pointer (from the configuration table entry) and the memory address (from the interrupt data). GPU interrupt handler 1530 may also update the affected registry tables/queues.

In some embodiments, GPU 1514 may be treated like a device with which the CPU can only communicated through the graphics driver, where the thread ID is passed on to the GPU driver as a method for GPU 1514 to track the CPU thread ID corresponding to an assigned task. Further, GPU 1514 may send back to the CPU, the CPU thread ID of each and every completed task such that the CPU (or rather interrupt handler 1530 which may reside on the CPU) can effectively use the CPU thread ID to identify the registry table entries of completed GPU tasks and signals CPU thread 1851.

It is to be noted that conventional techniques do not provide for a GPU to send back to a CPU, the CPU thread ID of completed tasks.

Figure 19A:
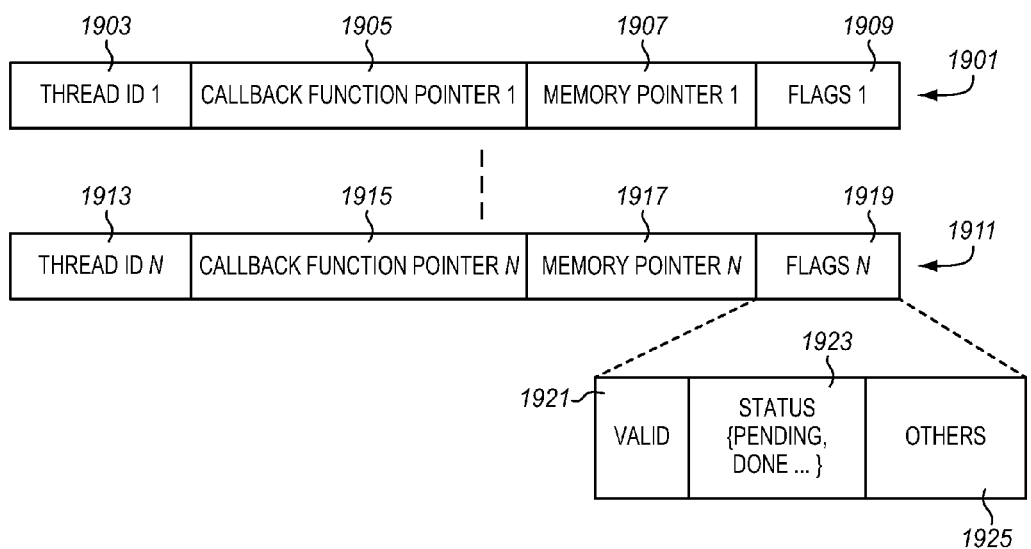
FIG. 19A illustrates entries and fields of a registry table/queue according to one embodiment.

FIG. 19A illustrates entries and fields of registry table/queue 1530 of FIG. 15 according to one embodiment. For brevity, many of the details discussed previously discussed with reference to FIGS. 1-18 may not be discussed or repeated hereafter. In one embodiment, registry table/queue 1530 of FIG. 15 may include any number of fields, such as field sets 1901 and 1911. For example, as illustrated, field set 1 1901 may include any number and type of fields, such as thread ID 1 1903, callback function pointer 1 1905, memory pointer 1 1907, and flags 1 1909, etc.; similarly, field set N 1911 may include any number and type of corresponding fields, such as thread ID N 1913, callback function pointer N 1915, memory pointer N 1917, and flags N 1919, etc.

In one embodiment, each of fields 1903-1909, 1913-1919 may contain an entry or value, such as thread IDs 1 1903 and N 1913 may include thread IDs corresponding to tasks as discussed with reference to FIG. 16. Similarly, callback function pointers 1 1905 and N 1915 may include callback function pointers as discussed with reference to FIG. 16. Other fields, such as memory pointers 1 1907, N 1917 and flags 1 1909, N 1919 may also include their corresponding entries or values. For example, as illustrated with reference to flags N 1919, the field of flags N 1919 may include any number of entries or values relating to a task, such as information relating to the validity of the task (e.g., valid 1921), pending or current status of the task (e.g., status 1923 (such as "pending", "done", etc.)), and any other information, such as other 1925, relating or pertinent to the task. In one embodiment, memory pointers 1 1907, N 1909 may reference one or more memory locations with computation results of completed GPU tasks in any data format or encapsulated in any data structures as may be interpreted by CPU callback function.

Figure 19B:
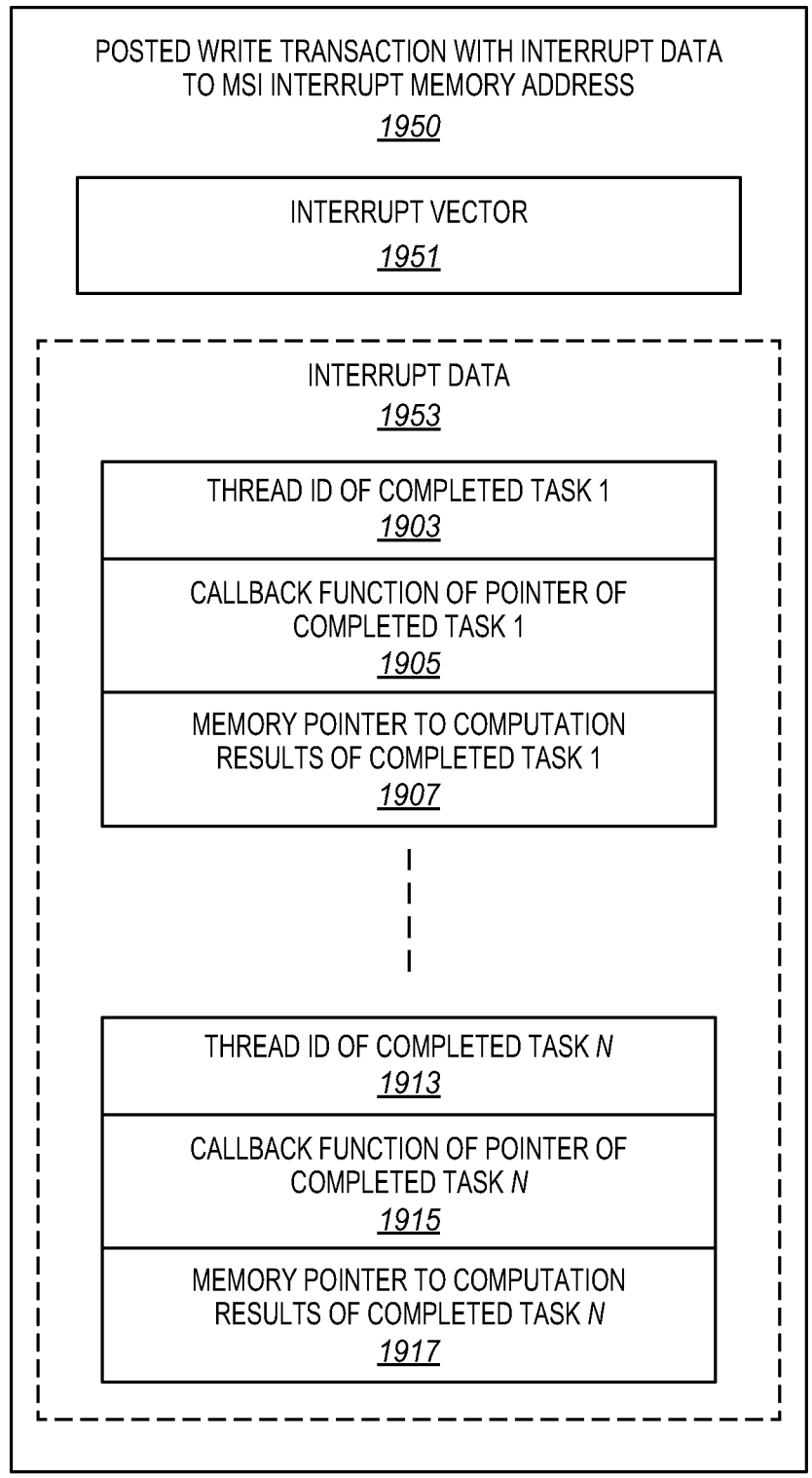
FIG. 19B illustrates interrupt data fields according to one embodiment.

FIG. 19B illustrates interrupt data fields according to one embodiment. For brevity, many of the details discussed previously discussed with reference to FIGS. 1-19A may not be discussed or repeated hereafter. In the illustrated embodiment, post write transaction with interrupt data to MSI interrupt memory address 1950 may include any number and type of fields corresponding to entries and fields of FIG. 19A according to one embodiment. For example, interrupt vector 1951 may relate to an interrupt of a CPU of a computing device, such as when moving of a mouse, pressing of a key on a keyboard, and/or the like, resulting in an interruption. Relating to interrupt vector 1951 is interrupt data 1953 that includes a number of fields 1903-1907, 1913-1917 having various entries and values as described with reference to FIG. 19A.

For example, relating to task 1, fields of interrupt data 1953 may include thread ID 1903, callback function pointer 1903, and memory pointer to computation results 1907 relating to task 1 and similarly, relating to task N, fields of interrupt data 1953 may include thread ID 1913, callback function pointer 1915, and memory pointer to computation results 1917 relating to task N.

Figure 19C:
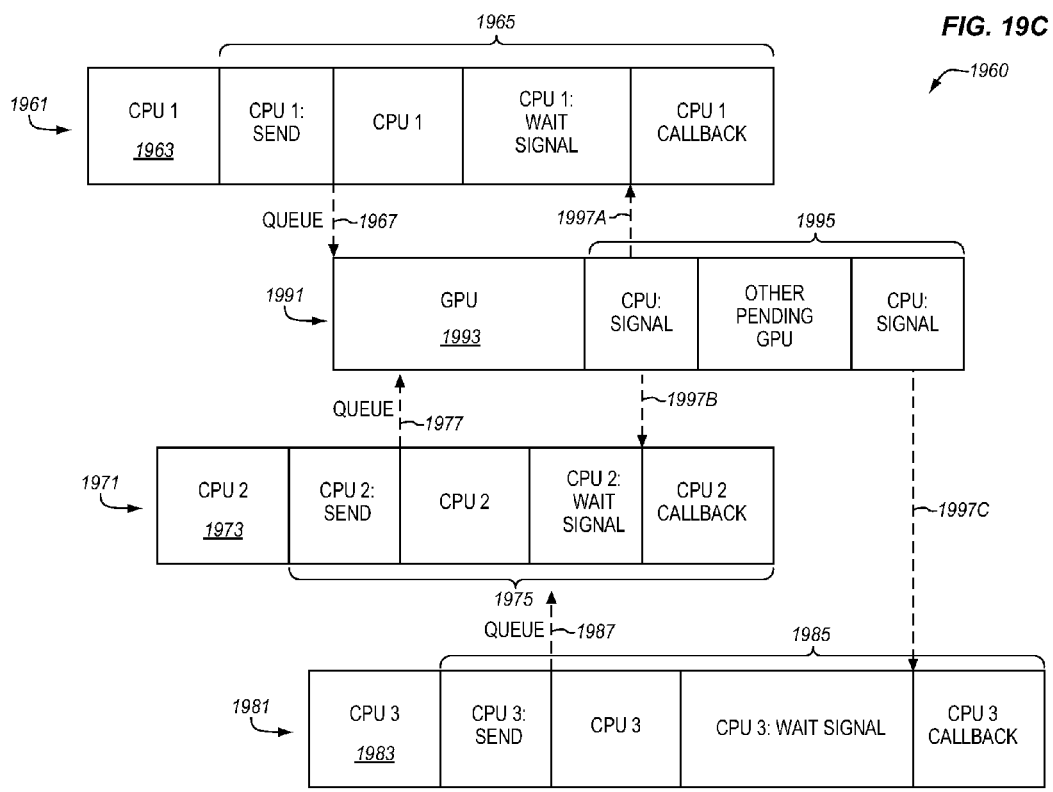
FIG. 19C illustrates CPU-GPU task scheduling according to one embodiment.

FIG. 19C illustrates CPU-GPU task scheduling according to one embodiment. For brevity, many of the details previously discussed with reference to FIGS. 1-19B may not be discussed or repeated hereafter. In one embodiment, CPU transactions 1961, 1971 and 1981 relating to CPU 1 1963, CPU 2 1973, and CPU 3 1983, respectively, along with GPU transaction 1991 relating to GPU 1993 are provided where CPUs 1963, 1973, 1983 that are similar to or the same as CPU 1512 of FIG. 15 are in communication with GPU 1993 that is similar to or the same as GPU 1514 of FIG. 15.

As illustrated, in one embodiment, CPU transaction 1961 includes a sequence of processes 1965, including signals, callbacks, etc., with respect to request and completion of a task, such as task 1, and communication of data, such as signals, etc., between CPU 1 1963 and GPU 1993. For example, upon sending of request for GPU task 1, it is queued 1967 by GPU 1993 and correspondingly, signal 1997A is communicated from GPU 1993 to CPU 1 1963.

Similarly, in one embodiment, CPU transactions 1971 and 1981 include sequences of processes 1975, 1985 including signals, callbacks, etc., with respect to requests and completions of tasks, such as tasks 2 and 3, and communication of data, such as signals, etc., between CPU 2 1973, CPU 3 1983 and GPU 1993. For example, upon sending of requests for GPU tasks 2 and 3, they are queued 1977, 1987 by GPU 1993 and correspondingly, signals 1997B, 1997C are communicated from GPU 1993 to CPUs 2 1973 and 3 1983.

In some embodiments, callbacks relate to emulated GPU callbacks interrupts, as indicated by signals 1997A-1997C, to enable multiple CPU threads associated with multiple CPUs 1-3 1963-1983 to asynchronously issue tasks, as indicated by queues 1967-1987, to GPU 1993. Each CPU thread may be individually signaled when its issued task is completed without blocking other threads from issuing additional tasks to GPU 1993.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the foregoing specification, embodiments have been described with reference to specific exemplary embodiments thereof. It will, however, be evident that various modifications and changes may be made thereto without departing from the broader spirit and scope of embodiments as set forth in the appended claims. The Specification and drawings are, accordingly, to be regarded in an illustrative rather than a restrictive sense.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes an apparatus to facilitate callback interrupt handling for multi-threaded applications in computing environments, the apparatus comprising: detection/invocation logic to detect a task issued by a thread associated with an application processor, wherein the task is to be processed by a graphics processor at the apparatus; scheduling/queuing logic to schedule the task at the graphics processor; emulating/disabling logic to emulate an interrupt to the application processor, wherein the emulated interrupt disables one or more graphics interrupts while the task is being processed by the graphics processor; and interrupt handler facilitation logic to facilitate an interrupt handler to communicate a signal to the application processor to wake up the thread, wherein the thread is facilitated to perform one or more tasks independent of the task being processed by the graphics processor.

Example 2 includes the subject matter of Example 1, further comprising registry table maintenance logic to maintain a registry table/queue associated with a graphics driver to indicate an addition of the scheduled task to a queue having pending tasks scheduled to be performed, wherein maintaining the registry table/queue comprises storing at least one of a thread identification (ID) referencing the thread, a callback function pointer, and one or more flags by the thread, and updating, by the interrupt handler, at least one of a memory pointer and the one or more flags, wherein issuing the task comprises invoking an application programming interface (API) of the graphics driver, wherein the API includes the thread ID referencing the thread, and wherein scheduling of task comprises storing the thread ID at the graphics processor, wherein the thread ID is sent back to the application processor as an interrupt data upon completion of the task.

Example 3 includes the subject matter of Example 2, wherein maintaining the registry table/queue comprises updating one or more fields of the registry table/queue with entries relating to the thread or the task, wherein the entries comprise one or more of the thread ID, the callback function pointer, the memory pointer, and the one or more flags, wherein the thread ID to identify the thread, and wherein the one or more flags to indicate a pending status of the task.

Example 4 includes the subject matter of Example 3, wherein maintaining the registry table/queue comprises freeing up the one or more fields occupied with the entries relating to the thread or the task to make room for subsequent entries relating to a subsequent thread or a subsequent task.

Example 5 includes the subject matter of Example 1, wherein the emulated interrupt is further to invoke the interrupt handler associated with the graphics driver to signal the application processor with task values comprising one or more of the entries associated with the thread ID, wherein the one or more of the entries include the callback function pointer, the memory pointer, or the one or more flags.

Example 6 includes the subject matter of Example 5, wherein the task values further comprise computational results relating to the task, wherein the computational results are obtained upon completion of the task and allow the thread to perform one or more tasks dependent on the task.

Example 7 includes the subject matter of Example 1, wherein the emulated interrupt comprises an emulated message signaled interrupt (MSI) that is generated based on a posted write transaction from a predetermined memory location allocated from a processor cache, wherein the posted write transaction is based on at least one of interrupt data and interrupt vector.

Example 8 includes the subject matter of Example 7, wherein the interrupt data comprises information relating to a state of the apparatus, wherein the state includes an operating state and wherein the thread ID and the memory pointer are classified as the operating state.

Some embodiments pertain to Example 9 that includes a method for facilitating callback interrupt handling for multi-threaded applications in computing environments, the method comprising: detecting a task issued by a thread associated with an application processor, wherein the task is to be processed by a graphics processor at a computing device; scheduling the task at the graphics processor; emulating an interrupt to the application processor, wherein the emulated interrupt disables one or more graphics interrupts while the task is being processed by the graphics processor; and facilitating an interrupt handler to communicate a signal to the application processor to wake up the thread, wherein the thread is facilitated to perform one or more tasks independent of the task being processed by the graphics processor.

Example 10 includes the subject matter of Example 9, further comprising maintaining a registry table/queue associated with a graphics driver to indicate an addition of the scheduled task to a queue having pending tasks scheduled to be performed, wherein maintaining the registry table/queue comprises storing at least one of a thread identification (ID) referencing the thread, a callback function pointer, and one or more flags by the thread, and updating, by the interrupt handler, at least one of a memory pointer and the one or more flags, wherein issuing the task comprises invoking an application programming interface (API) of the graphics driver, wherein the API includes the thread ID referencing the thread, and wherein scheduling the task comprises storing the thread ID at the graphics processor, wherein the thread ID is sent back to the application processor as an interrupt data upon completion of the task.

Example 11 includes the subject matter of Example 10, wherein maintaining the registry table/queue comprises updating one or more fields of the registry table/queue with entries relating to the thread or the task, wherein the entries comprise one or more of the thread ID, the callback function pointer, the memory pointer, and the one or more flags, wherein the thread ID to identify the thread, and wherein the one or more flags to indicate a pending status of the task.

Example 12 includes the subject matter of Example 11, wherein maintaining the registry table/queue comprises freeing up the one or more fields occupied with the entries relating to the thread or the task to make room for subsequent entries relating to a subsequent thread or a subsequent task.

Example 13 includes the subject matter of Example 9, wherein the emulated interrupt is further to invoke the interrupt handler associated with the graphics driver to signal the application processor with task values comprising one or more of the entries associated with the thread ID, wherein the one or more of the entries include the callback function pointer, the memory pointer, or the one or more flags.

Example 14 includes the subject matter of Example 13, wherein the task values further comprise computational results relating to the task, wherein the computational results are obtained upon completion of the task and allow the thread to perform one or more tasks dependent on the task.

Example 15 includes the subject matter of Example 9, wherein the emulated interrupt comprises an emulated message signaled interrupt (MSI) that is generated based on a posted write transaction from a predetermined memory location allocated from a processor cache, wherein the posted write transaction is based on at least one of interrupt data and interrupt vector.

Example 16 includes the subject matter of Example 15, wherein the interrupt data comprises information relating to a state of the computing device, wherein the state includes an operating state and wherein the thread ID and the memory pointer are classified as the operating state.

Some embodiments pertain to Example 17 includes a system comprising a storage device having instructions, and a processor to execute the instructions to perform or facilitate a mechanism to perform one or more operations comprising: detecting a task issued by a thread associated with an application processor, wherein the task is to be processed by a graphics processor at a computing device; scheduling the task at the graphics processor; emulating an interrupt to the application processor, wherein the emulated interrupt disables one or more graphics interrupts while the task is being processed by the graphics processor; and facilitating an interrupt handler to communicate a signal to the application processor to wake up the thread, wherein the thread is facilitated to perform one or more tasks independent of the task being processed by the graphics processor.

Example 18 includes the subject matter of Example 17, wherein the one or more operations comprise maintaining a registry table/queue associated with a graphics driver to indicate an addition of the scheduled task to a queue having pending tasks scheduled to be performed, wherein maintaining the registry table/queue comprises storing at least one of a thread identification (ID) referencing the thread, a callback function pointer, and one or more flags by the thread, and updating, by the interrupt handler, at least one of a memory pointer and the one or more flags, wherein issuing the task comprises invoking an application programming interface (API) of the graphics driver, wherein the API includes the thread ID referencing the thread, and wherein scheduling the task comprises storing the thread ID at the graphics processor, wherein the thread ID is sent back to the application processor as an interrupt data upon completion of the task.

Example 19 includes the subject matter of Example 18, wherein maintaining the registry table/queue comprises updating one or more fields of the registry table/queue with entries relating to the thread or the task, wherein the entries comprise one or more of the thread ID, the callback function pointer, the memory pointer, and the one or more flags, wherein the thread ID to identify the thread, and wherein the one or more flags to indicate a pending status of the task.

Example 20 includes the subject matter of Example 19, wherein maintaining the registry table/queue comprises freeing up the one or more fields occupied with the entries relating to the thread or the task to make room for subsequent entries relating to a subsequent thread or a subsequent task.

Example 21 includes the subject matter of Example 17, wherein the emulated interrupt is further to invoke the interrupt handler associated with the graphics driver to signal the application processor with task values comprising one or more of the entries associated with the thread ID, wherein the one or more of the entries include the callback function pointer, the memory pointer, or the one or more flags.

Example 22 includes the subject matter of Example 21, wherein the task values further comprise computational results relating to the task, wherein the computational results are obtained upon completion of the task and allow the thread to perform one or more tasks dependent on the task.

Example 23 includes the subject matter of Example 17, wherein the emulated interrupt comprises an emulated message signaled interrupt (MSI) that is generated based on a posted write transaction from a predetermined memory location allocated from a processor cache, wherein the posted write transaction is based on at least one of interrupt data and interrupt vector.

Example 24 includes the subject matter of Example 23, wherein the interrupt data comprises information relating to a state of the computing device, wherein the state includes an operating state and wherein the thread ID and the memory pointer are classified as the operating state.

Some embodiments pertain to Example 25 includes an apparatus comprising: means for detecting a task issued by a thread associated with an application processor, wherein the task is to be processed by a graphics processor at the apparatus; means for scheduling the task at the graphics processor; means for emulating an interrupt to the application processor, wherein the emulated interrupt disables one or more graphics interrupts while the task is being processed by the graphics processor; and means for facilitating an interrupt handler to communicate a signal to the application processor to wake up the thread, wherein the thread is facilitated to perform one or more tasks independent of the task being processed by the graphics processor.

Example 26 includes the subject matter of Example 25, further comprising means for maintaining a registry table/queue associated with a graphics driver to indicate an addition of the scheduled task to a queue having pending tasks scheduled to be performed, wherein the means for maintaining the registry table/queue comprises means for storing at least one of a thread identification (ID) referencing the thread, a callback function pointer, and one or more flags by the thread, and means for updating, by the interrupt handler, at least one of a memory pointer and the one or more flags, wherein the means for issuing the task comprises means for invoking an application programming interface (API) of the graphics driver, wherein the API includes the thread ID referencing the thread, and wherein the means for scheduling the task comprises means for storing the thread ID at the graphics processor, wherein the thread ID is sent back to the application processor as an interrupt data upon completion of the task.

Example 27 includes the subject matter of Example 26, wherein the means for maintaining the registry table/queue comprises means for updating one or more fields of the registry table/queue with entries relating to the thread or the task, wherein the entries comprise one or more of the thread ID, the callback function pointer, the memory pointer, and the one or more flags, wherein the thread ID to identify the thread, and wherein the one or more flags to indicate a pending status of the task.

Example 28 includes the subject matter of Example 27, wherein the means for maintaining the registry table/queue comprises means for freeing up the one or more fields occupied with the entries relating to the thread or the task to make room for subsequent entries relating to a subsequent thread or a subsequent task.

Example 29 includes the subject matter of Example 25, wherein the emulated interrupt is further to invoke the interrupt handler associated with the graphics driver to signal the application processor with task values comprising one or more of the entries associated with the thread ID, wherein the one or more of the entries include the callback function pointer, the memory pointer, or the one or more flags.

Example 30 includes the subject matter of Example 29, wherein the task values further comprise computational results relating to the task, wherein the computational results are obtained upon completion of the task and allow the thread to perform one or more tasks dependent on the task.

Example 31 includes the subject matter of Example 25, wherein the emulated interrupt comprises an emulated message signaled interrupt (MSI) that is generated based on a posted write transaction from a predetermined memory location allocated from a processor cache, wherein the posted write transaction is based on at least one of interrupt data and interrupt vector.

Example 32 includes the subject matter of Example 31, wherein the interrupt data comprises information relating to a state of the apparatus, wherein the state includes an operating state and wherein the thread ID and the memory pointer are classified as the operating state.

Example 33 includes at least one non-transitory or tangible machine-readable medium comprising a plurality of instructions, when executed on a computing device, to implement or perform a method as claimed in any of claims or examples 9-16.

Example 34 includes at least one machine-readable medium comprising a plurality of instructions, when executed on a computing device, to implement or perform a method as claimed in any of claims or examples 9-16.

Example 35 includes a system comprising a mechanism to implement or perform a method as claimed in any of claims or examples 9-16.

Example 36 includes an apparatus comprising means for performing a method as claimed in any of claims or examples 9-16.

Example 37 includes a computing device arranged to implement or perform a method as claimed in any of claims or examples 9-16.

Example 38 includes a communications device arranged to implement or perform a method as claimed in any of claims or examples 9-16.

Example 39 includes at least one machine-readable medium comprising a plurality of instructions, when executed on a computing device, to implement or perform a method or realize an apparatus as claimed in any preceding claims.

Example 40 includes at least one non-transitory or tangible machine-readable medium comprising a plurality of instructions, when executed on a computing device, to implement or perform a method or realize an apparatus as claimed in any preceding claims.

Example 41 includes a system comprising a mechanism to implement or perform a method or realize an apparatus as claimed in any preceding claims.

Example 42 includes an apparatus comprising means to perform a method as claimed in any preceding claims.

Example 43 includes a computing device arranged to implement or perform a method or realize an apparatus as claimed in any preceding claims.

Example 44 includes a communications device arranged to implement or perform a method or realize an apparatus as claimed in any preceding claims.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
    detection/invocation logic to detect a task issued by a thread associated with an application processor, the task being associated with a thread identification (ID) referencing the thread, wherein the task is to be processed by a graphics processor at the apparatus;
    scheduling/queuing logic to schedule the task at the graphics processor;
    emulating/disabling logic to emulate an interrupt to the application processor, wherein the emulated interrupt disables one or more graphics interrupts while the task is being processed by the graphics processor; and
    interrupt handler facilitation logic to facilitate an interrupt handler to communicate a signal to the application processor to wake up the thread, wherein the thread ID is sent back to the application processor as interrupt data upon completion of the task, and wherein the thread is facilitated to perform one or more tasks independent of the task being processed by the graphics processor.

2. The apparatus of claim 1, further comprising registry table maintenance logic to maintain a registry table/queue associated with a graphics driver to indicate an addition of the scheduled task to a queue having pending tasks scheduled to be performed, wherein maintaining the registry table/queue comprises storing at least one of the thread ID, a callback function pointer, and one or more flags by the thread, and updating, by the interrupt handler, at least one of a memory pointer and the one or more flags,
    wherein issuing the task comprises invoking an application programming interface (API) of the graphics driver, wherein the API includes the thread ID referencing the thread, and
    wherein scheduling of task comprises storing the thread ID at the graphics processor.

3. The apparatus of claim 2, wherein maintaining the registry table/queue comprises updating one or more fields of the registry table/queue with entries relating to the thread or the task, wherein the entries comprise one or more of the thread ID, the callback function pointer, the memory pointer, and the one or more flags, wherein the thread ID to identify the thread, and wherein the one or more flags to indicate a pending status of the task.

4. The apparatus of claim 3, wherein maintaining the registry table/queue comprises freeing up the one or more fields occupied with the entries relating to the thread or the task to make room for subsequent entries relating to a subsequent thread or a subsequent task.

5. The apparatus of claim 2, wherein the emulated interrupt is further to invoke the interrupt handler associated with the graphics driver to signal the application processor with task values comprising one or more of the entries associated with the thread ID, wherein the one or more of the entries include the callback function pointer, the memory pointer, or the one or more flags.

6. The apparatus of claim 5, wherein the task values further comprise computational results relating to the task, wherein the computational results are obtained upon completion of the task and allow the thread to perform one or more tasks dependent on the task.

7. The apparatus of claim 2, wherein the emulated interrupt comprises an emulated message signaled interrupt (MSI) that is generated based on a posted write transaction from a predetermined memory location allocated from a processor cache, wherein the posted write transaction is based on at least one of interrupt data and interrupt vector.

8. The apparatus of claim 7, wherein the interrupt data comprises information relating to a state of the apparatus, wherein the state includes an operating state and wherein the thread ID and the memory pointer are classified as the operating state.

9. A method comprising:
    detecting a task issued by a thread associated with an application processor, the task being associated with a thread identification (ID) referencing the thread, wherein the task is to be processed by a graphics processor at a computing device;
    scheduling the task at the graphics processor;
    emulating an interrupt to the application processor, wherein the emulated interrupt disables one or more graphics interrupts while the task is being processed by the graphics processor; and
    facilitating an interrupt handler to communicate a signal to the application processor to wake up the thread, wherein the thread ID is sent back to the application processor as interrupt data upon completion of the task, and wherein the thread is facilitated to perform one or more tasks independent of the task being processed by the graphics processor.

10. The method claim 9, further comprising maintaining a registry table/queue associated with a graphics driver to indicate an addition of the scheduled task to a queue having pending tasks scheduled to be performed, wherein maintaining the registry table/queue comprises storing at least one of the thread ID, a callback function pointer, and one or more flags by the thread, and updating, by the interrupt handler, at least one of a memory pointer and the one or more flags, wherein issuing the task comprises invoking an application programming interface (API) of the graphics driver, wherein the API includes the thread ID referencing the thread, and wherein scheduling the task comprises storing the thread ID at the graphics processor.

11. The method claim 10, wherein maintaining the registry table/queue comprises updating one or more fields of the registry table/queue with entries relating to the thread or the task, wherein the entries comprise one or more of the thread ID, the callback function pointer, the memory pointer, and the one or more flags, wherein the thread ID to identify the thread, and wherein the one or more flags to indicate a pending status of the task.

12. The method claim 11, wherein maintaining the registry table/queue comprises freeing up the one or more fields occupied with the entries relating to the thread or the task to make room for subsequent entries relating to a subsequent thread or a subsequent task.

13. The method claim 10, wherein the emulated interrupt is further to invoke the interrupt handler associated with the graphics driver to signal the application processor with task values comprising one or more of the entries associated with the thread ID, wherein the one or more of the entries include the callback function pointer, the memory pointer, or the one or more flags.

14. The method claim 13, wherein the task values further comprise computational results relating to the task, wherein the computational results are obtained upon completion of the task and allow the thread to perform one or more tasks dependent on the task.

15. The method claim 10, wherein the emulated interrupt comprises an emulated message signaled interrupt (MSI) that is generated based on a posted write transaction from a predetermined memory location allocated from a processor cache, wherein the posted write transaction is based on at least one of interrupt data and interrupt vector.

16. The method claim 15, wherein the interrupt data comprises information relating to a state of the computing device, wherein the state includes an operating state and wherein the thread ID and the memory pointer are classified as the operating state.

17. At least one machine-readable storage medium comprising a plurality of instructions, executed on a computing device, to facilitate the computing device to perform operations comprising:

detecting a task issued by a thread associated with an application processor, the task being associated with a thread identification (ID) referencing the thread wherein the task is to be processed by a graphics processor at a computing device;

scheduling the task at the graphics processor;

emulating an interrupt to the application processor, wherein the emulated interrupt disables one or more graphics interrupts while the task is being processed by the graphics processor; and facilitating an interrupt handler to communicate a signal to the application processor to wake up the thread, wherein the thread ID is sent back to the application processor as interrupt data upon completion of the task, and wherein the thread is facilitated to perform one or more tasks independent of the task being processed by the graphics processor.

18. The machine-readable storage medium claim 17, wherein the operations further comprise maintaining a registry table/queue associated with a graphics driver to indicate an addition of the scheduled task to a queue having pending tasks scheduled to be performed, wherein maintaining the registry table/queue comprises storing at least one of a the thread ID, a callback function pointer, and one or more flags by the thread, and updating, by the interrupt handler, at least one of a memory pointer and the one or more flags, wherein issuing the task comprises invoking an application programming interface (API) of the graphics driver, wherein the API includes the thread ID referencing the thread, and wherein scheduling the task comprises storing the thread ID at the graphics processor.

19. The machine-readable storage medium claim 18, wherein maintaining the registry table/queue comprises updating one or more fields of the registry table/queue with entries relating to the thread or the task, wherein the entries comprise one or more of the thread ID, the callback function pointer, the memory pointer, and the one or more flags, wherein the thread ID to identify the thread, and wherein the one or more flags to indicate a pending status of the task.

20. The machine-readable storage medium claim 19, wherein maintaining the registry table/queue comprises freeing up the one or more fields occupied with the entries relating to the thread or the task to make room for subsequent entries relating to a subsequent thread or a subsequent task.

21. The machine-readable storage medium claim 18, wherein the emulated interrupt is further to invoke the interrupt handler associated with the graphics driver to signal the application processor with task values comprising one or more of the entries associated with the thread ID, wherein the one or more of the entries include the callback function pointer, the memory pointer, or the one or more flags.

22. The machine-readable storage medium claim 21, wherein the task values further comprise computational results relating to the task, wherein the computational results are obtained upon completion of the task and allow the thread to perform one or more tasks dependent on the task.

23. The machine-readable storage medium claim 17, wherein the emulated interrupt comprises an emulated message signaled interrupt (MSI) that is generated based on a posted write transaction from a predetermined memory location allocated from a processor cache, wherein the posted write transaction is based on at least one of interrupt data and interrupt vector.

24. The machine-readable storage medium claim 23, wherein the interrupt data comprises information relating to a state of the computing device, wherein the state includes an operating state and wherein the thread ID and the memory pointer are classified as the operating state.

\* \* \* \* \*